United States Patent
Roberts, Jr. et al.

(10) Patent No.: US 9,635,131 B2
(45) Date of Patent: Apr. 25, 2017

(54) MEDIA PLAYER DISTRIBUTION AND COLLABORATIVE EDITING

(71) Applicant: QWIRE HOLDINGS LLC, Wilmington, DE (US)

(72) Inventors: Leigh B. Roberts, Jr., Altadena, CA (US); Jonathan Louis Ehrlich, Los Angeles, CA (US); Scott Freiman, Irvington, NY (US)

(73) Assignee: Qwire Inc., Sleepy Hollow, NY (US)

( * ) Notice: Subject to any disclaimer, the term of this patent is extended or adjusted under 35 U.S.C. 154(b) by 0 days.

(21) Appl. No.: 15/014,839

(22) Filed: Feb. 3, 2016

(65) Prior Publication Data
US 2016/0234345 A1    Aug. 11, 2016

Related U.S. Application Data

(60) Provisional application No. 62/112,578, filed on Feb. 5, 2015.

(51) Int. Cl.
*G06F 15/16* (2006.01)
*H04L 29/08* (2006.01)
*H04L 29/06* (2006.01)

(52) U.S. Cl.
CPC ........ *H04L 67/306* (2013.01); *H04L 65/4084* (2013.01); *H04L 67/1095* (2013.01)

(58) Field of Classification Search
CPC ................... H04L 29/08072; G06F 17/30899
USPC ...... 709/203, 218, 219, 230, 232; 725/9, 34, 725/36
See application file for complete search history.

(56) References Cited

U.S. PATENT DOCUMENTS

| | | | | |
|---|---|---|---|---|
| 8,719,881 B2* | 5/2014 | Riedl | ................ | H04N 7/17318 709/231 |
| 8,935,713 B1* | 1/2015 | Gabel | .................... | H04H 60/65 705/14.53 |
| 2008/0005348 A1* | 1/2008 | Kosiba | .............. | H04L 29/06027 709/231 |
| 2012/0054808 A1* | 3/2012 | Nijim | ............... | H04N 21/47202 725/88 |

(Continued)

OTHER PUBLICATIONS

"Mirage Media Server"—Autonomic Controls, Sep. 2014 http://www.autonomic-controls.com/documents/mms/manual_mms_servers_web_2014.pdf.*

*Primary Examiner* — Randy Scott
(74) *Attorney, Agent, or Firm* — Hickman Palermo Becker Bingham LLP

(57) ABSTRACT

In one approach, a server computer receives a playlist from a first client computer, wherein the playlist identifies a plurality of media assets and includes synchronization information that specifies how to present the plurality of media assets as a synchronized media presentation. The server computer receives a request from the first client computer to share the playlist with a second client computer. The server computer causes the plurality of media assets to be deposited in a client storage accessible to the second client computer. The server computer sends the playlist to the second client computer. The second client computer presents the synchronized media presentation based on the plurality of media assets deposited in the client storage and the synchronization information of the playlist.

22 Claims, 26 Drawing Sheets

(56) References Cited

U.S. PATENT DOCUMENTS

2014/0118468 A1* 5/2014 Purdy .................... H04N 7/141
348/14.08
2014/0282772 A1* 9/2014 Chen ................ H04N 21/26258
725/97

* cited by examiner

MEDIA PLAYER DISTRIBUTION AND COLLABORATIVE EDITING

BENEFIT CLAIM

This application claims the benefit under 35 U.S.C. 119(e) of provisional application 62/112,578, filed Feb. 5, 2015, the entire contents of which are hereby incorporated by reference for all purposes as though fully set forth herein.

FIELD OF THE DISCLOSURE

The present disclosure generally relates to digital media production. The present disclosure relates more specifically to computer-implemented techniques for editing synchronization between digital audio files and digital video files, and for sharing the synchronized media with other users for review.

BACKGROUND

In the course of creating a media production, multiple members of a production team may work together to create a coherent product. One task in the creation of a media production is to synchronize recorded audio tracks with recorded video scenes. For example, one member of the production team may specify the scenes that need music, another member of the production team may be in charge of finding music for those scenes, another member may align the start and end of a particular music track with particular frames of a video scene, and yet another member of the production team may be in charge of reviewing the mix to decide if the result makes the final cut. In order to streamline the reviewing process, the production member in charge of finding music for scenes will often create multiple alternative tracks for the same scene, for the reviewer to decide among.

One technique used to transport the audio/video mixes to other members is to create a fixed movie file with the embedded audio and then either email the file to the intended recipient or post the fixed movie file to a file server for retrieval. Manually burning and delivering compact disks and DVDs also may be done. However, current techniques suffer from numerous deficiencies. As one example, in order to present an updated version of the mix a new fixed movie file would need to be generated and sent to the recipient. Thus, additional time is required to compile and send a slightly updated version of the mix over and over again until the reviewer is satisfied. In addition, if multiple alternative tracks need to be reviewed, a fixed movie file for each alternative track would need to be generated and sent, resulting in inefficient network and storage utilization. Furthermore, traditional media players have not been designed for editing synchronization of video and audio in a collaborative environment, and thus provide little to no tools which allow for efficient editing and commenting of synchronized media presentations.

DESCRIPTION OF EXAMPLE EMBODIMENTS

Figure 1:
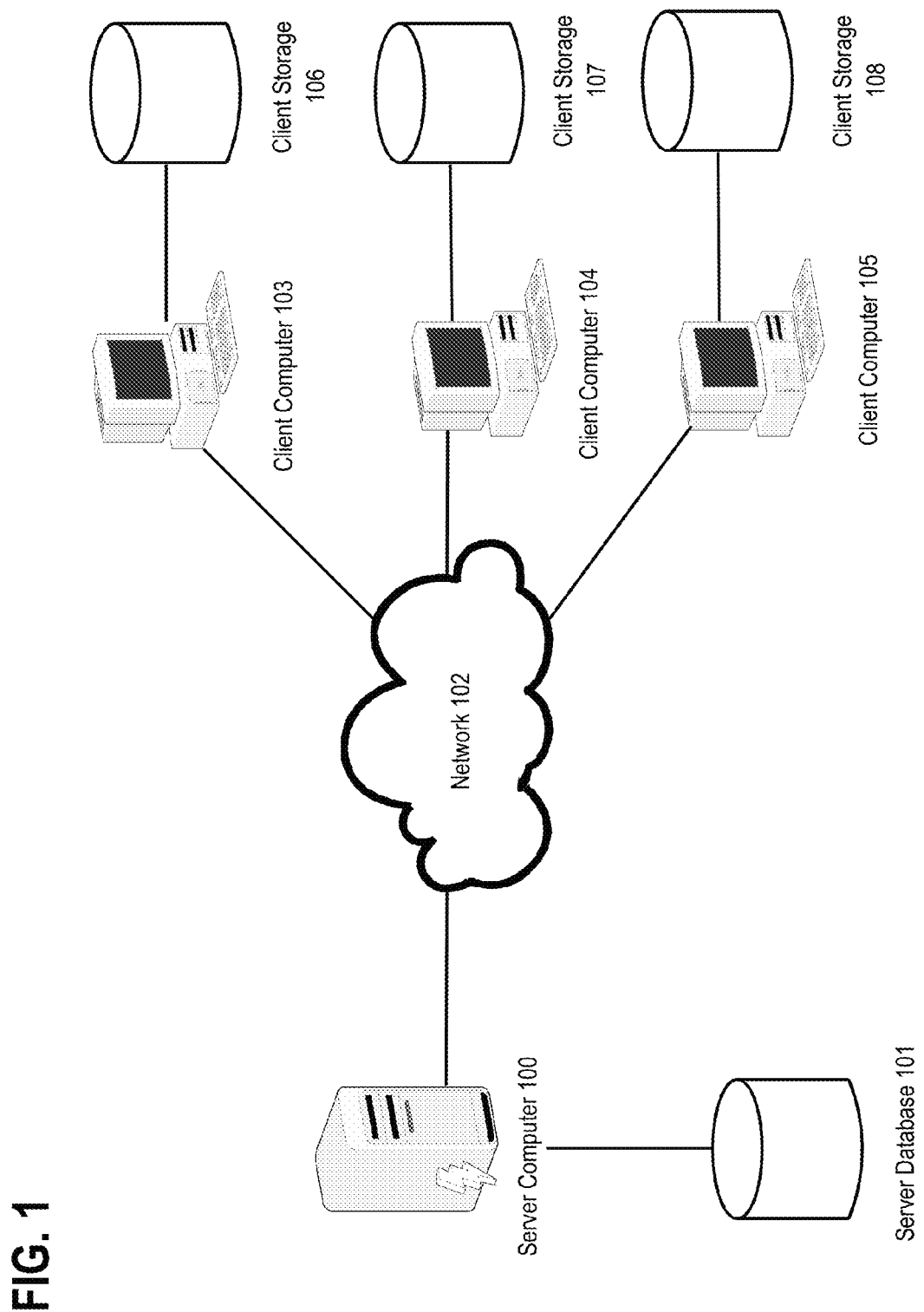
FIG. 1 illustrates a computer-networking environment upon which an embodiment may be implemented.

In the description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Abbreviations
   3.0 Example Operating Environment
      3.1 Example Server and Database Details
      3.2 Example Client and Storage Details 4.0 Metadata and Playlist Sharing
  4.1 Process Flow
  4.2 Sharing Examples
  4.3 Server File System Example
5.0 Production Overview Interface
6.0 Video Player Interface
7.0 Spotting to Video Player Interface
8.0 Playlist Review Interface
9.0 Playlist Sharing Interface
10.0 Third Party Sharing Interface
11.0 Multiple Platform Availability
12.0 Remote Spotting
  12.1 Remote Spotting Controller Interface
  12.2 Remote Spotting Client Interface
13.0 Hardware Overview
14.0 Extensions and Alternatives
15.0 Additional Disclosure
1.0 General Overview In an embodiment, a media player application allows for secure playback of video and audio files to enable comparison, selection, commenting, collaboration, and other features that facilitate the production of film, television, internet video, and other types of programming. The media player application also supports other professional and consumer applications to preview and select from multiple combinations of synchronized audio and video content.

In an embodiment, the media player application presents users with a playlist of video clips and associated audio. Users select specific audio from the available tracks to preview the video with the chosen audio tracks. The playlist may combine multiple listings of the same video clip, each with different audio; multiple video clips, each with associated audio; or any combination of the aforementioned. Each video clip can include audio that is embedded in the video file as well as separate audio tracks that can be played in sync with the video file.

In an embodiment, the media player application supports multiple audio and video file formats and is platform independent. The media player application allows for secure playback by trusted users who can be granted access through multiple means of secure authorization.

In an embodiment, the media player application enables users to independently test and set volume levels for each of the available audio tracks. The player also enables users to select a sync point within a video using timecode as a reference point and a starting point within a separate audio file in order to sync the audio and the video. The player also supports multiple navigation tools to adjust playback to different points in the content such as via manual slider or sync point to sync point jumping.

In an embodiment, with the media player application, audio and video assets can be hosted locally on the computer of the playback user or other similarly capable device while the related metadata, such as the information used to synchronize the assets, remains hosted and stored in secure network infrastructure accessed via the Internet in order to allow for multiple users to have the same playback experiences without having to produce fixed audio/video mixes and distribute those fixed playback files one-by-one to users. The media player application is thus able to take the locally stored media assets and combine those assets with the metadata (referred to as a playlist) to produce a synchronized audio/video production on the fly for viewing by a user. In addition, the separation of the metadata from the media assets promotes network efficiency since updating the metadata to edit the synchronization of the assets can be performed by transporting metadata, rather than transporting an entire fixed audio/video mix.

In an embodiment, the media player application leverages secure file transport and client-server synchronization capabilities of an online file sharing or hosting service to distribute audio and video assets to authorized users for those specific content items. For example, in various embodiments the media player application may use DROPBOX, BOX.NET, GOOGLE DRIVE, or other online file hosting services for this purpose; other embodiments may use privately maintained data storage systems that are accessible to clients and servers over networks, and the use of a commercial service such as DROPBOX is not required. In an embodiment, the media player application shares these content assets via shared folders or directories that enable either the appropriate single user or group of users to have access to the assets that correspond to a specific production or playlist to be explored in the media player application.

In some embodiments, two or more users may be connected remotely where one user at a time has 'transport control'. Transport control allows the controlling user to dictate the position of the movie while the clients of the other users in the session mimic the commands of the controlling user. As a result, the display of the other users mimics the display of the controlling user. For example, the aforementioned transport control may be used in connection with a "spotting session" where a group of collaborators work together to identify where within a particular video or video clip cues should be added, representing locations within the video where music will eventually appear in the final production. Play, stop, rewind, fast forward, seek bar position, frame-by-frame stepping, and so forth synchronize between the client of the controlling user and the clients of the participating users. In some embodiments, only the commands used to synchronize control between the client of the controlling user and the clients of the participating users are sent across the intervening network. Thus, all assets are being accessed locally, with the manner of the playback being dictated by the commands. As a result, far less bandwidth is used compared to streaming technologies which typically involve the transmission of a large quantity of pixel data to communicate the content of each frame to display. Thus, even if the remote participants are at a location that does not provide a large amount of bandwidth, a sufficient framerate can be achieved during the remote spotting session.

In one embodiment, the media player application is a stand-alone application where video and audio assets are referenced or added to a playlist without utilizing a separate host application. In another embodiment, the media player is presented in a web browser (e.g. as a web application) or via a custom plugin for a web browser such as Internet Explorer, Chrome, Firefox, and so forth.

The term "synchronized" as used within the description contained herein has multiple meanings depending on the context in which the term is used. When referring to data, such as folders, synchronized means that there is a protocol or service in place that keeps the contents of the folders updated with one another (even if the update is performed on a delay). When referring to media assets, synchronization involves the timings and settings used to display the media assets in parallel and/or sequence with one another.

2.0 Abbreviations

PLR—Recipient of a playlist. For example, the recipient may include one or more users who have been authorized to receive the playlist (e.g. through a host application or via a web browser), such as users representing a variety of different roles such as composers, music editors, music supervisors, video editors, and so forth.

Satellite PLR—A playlist recipient that does not have access to the primary application and accesses features via a web browser or other commercially available or custom-built application.

Playlist—A collection of any video and/or audio assets and/or metadata relating to the video and/or audio assets.

PLT—Playlist track that contains one piece of music synced to video, or just a video without audio, or just audio without video.

Sync Point or Clip Start—Video timecode that specifies where audio files begin playback relative to a video file. For example, the timecode value may be stored in hh:mm:ss:ff, format, representing the hours, minutes, seconds, and/or frames where the audio begins playback relative to a video.

Audio Start—Audio timeline offset for starting playback. For example, the offset may be represented in fractional seconds, such as 4.55 seconds.

Pre-roll—A time value before the sync-point at which to begin playback of the movie file (e.g. frames, seconds, minutes, hours, and so forth).

Video Clip—the entirety or a portion of a video asset.
Audio Clip—the entirety or a portion of an audio asset.
CMP—Composer
MXE—Music Editor
MSP—Music Supervisor
PXE—Picture Editor
SMD—Studio Music Department 3.0 Example Operating Environment FIG. 1 illustrates a computer-based networking environment with which an embodiment may be implemented. In FIG. 1, server computer 100, client computer 103, client computer 104, and client computer 105 are communicatively coupled over network 102. The server computer 100 is communicatively coupled to a server database 101. Client computer 103, client computer 104, and client computer 105 are communicatively coupled to client storage 106, client storage 107, and client storage 108 respectively. Collectively, client computer 103, client computer 104, and client computer 105 are referred to as "the clients". The number of elements illustrated in FIG. 1 has been limited to a particular amount in order to illustrate clear examples. However, although only a particular number of elements are displayed in FIG. 1, in practice the computer-networking environment could have many more, even hundreds or thousands, of each element depicted in FIG. 1. Thus, there is no limit to the number of servers, clients, and networks that can be utilized by the techniques described herein.

In an embodiment, the server computer 100 represents any combination of hardware and/or software components that perform the functions described herein with respect to the server computer 100. Thus, for example, the server computer 100 may represent a single computer, a cluster of computers, a distributed network of computers, an application executing on a computer, and so forth. In some embodiments, the server computer 100 represents a computer as described in the "Hardware Overview". In an embodiment, the server computer 100 executes an application that assists with the creation and management of a media production, such as a television, movie, music, or other production. In an embodiment, the server computer 100 is responsible for processing communications from the clients and storing media assets and playlist data, such as audio settings, synchronization settings, and/or sharing authorizations in the server database 101. Furthermore, the server computer 100 is responsible for delivering media assets to authorized clients and controlling access to playlist data based on the sharing authorizations. For example, the server computer 100 may receive a communication from client computer 103 authorizing client computer 104 to view a particular playlist. In response, the server computer 100 pushes the media assets for the playlist to a shared folder within the associated client storage 107.

In an embodiment, network 102 represents any combination of one or more local networks, wide area networks, internetworks, or service provider networks. Data exchanged over network 102, may be transferred using any number of network layer protocols, transportation layer protocols, and/or application layer protocols. In some embodiments, network 102 represents one or more interconnected internetworks such as the public Internet. In an embodiment, network 102 carries messages between the server computer 100 and the clients.

In an embodiment, the clients represent any combination of hardware and/or software components that perform the functions described herein with respect to the clients. For example, the clients may each represent a desktop computer, a laptop, a smartphone, a tablet, an application executing on the aforementioned devices, combinations of the aforementioned, and so forth. In some embodiments, each of the clients represents a computer as described in the "Hardware Overview". In an embodiment, the clients are responsible for displaying interfaces to collect information related to a media production, such as media assets and playlist data and communicate that information to the server computer 100. In some embodiments, the clients display a media player that presents media assets synchronized based on playlist data received from the server computer 100 or stored locally within the associated client storage. Furthermore, in some embodiments, the media player is configured to allow the synchronization between the media assets to be edited dynamically.

In some embodiments, the clients present playlist information and the synchronized media assets in response to being the recipient of a playlist shared by another client. For example, client computer 103 may share a particular playlist with client computer 104 that references particular media assets and includes playlist data that specifies how to synchronize and present those media assets. In response, the server computer 100 pushes the media assets required to present the playlist to the client storage 107 associated with client computer 104. Client computer 104 then displays a notification that a shared playlist is available for review. Upon reviewing the playlist, client computer 104 retrieves the playlist information from the server computer 100, including the timecodes, sync points, volume levels, and so forth that indicate how to combine the media assets into a synchronized media presentation. The client computer 104 then generates an interface that includes a media player for viewing the synchronized media presentation, viewing metadata related to the presentation, posting comments related to the presentation, editing the synchronization of the media presentation, and so forth. In the event comments or edits are collected, the client computer 104 communicates those comments or edits to the server computer 100, which then communicates those comments to the client computer 103 for review. For example, the server computer 100 may cause the client computer 103 to present a notification to refresh an interface or may automatically cause the interface to refresh with the updated information.

In some embodiments, the playlist includes information that indicates how to present a single media asset. For example, the playlist may specify volume settings and a playback range of a single audio track or video clip. Thus, there is no requirement that the playlist specify how to synchronize and/or present multiple media assets.

Although the description refers to "client computers", in some embodiments the client computers represent accounts of particular users, rather than separate physical devices. In some embodiments, one or more of the clients share the same physical computer, but represent different accounts that can be accessed on that computer by supplying a credential, such as a username and password. For example, client computer 103 and client computer 104 may reside on the same device, with client storage 106 and client storage 107 representing file folders associated with the respective accounts.

3.1 Example Server and Database Details

Figure 2:
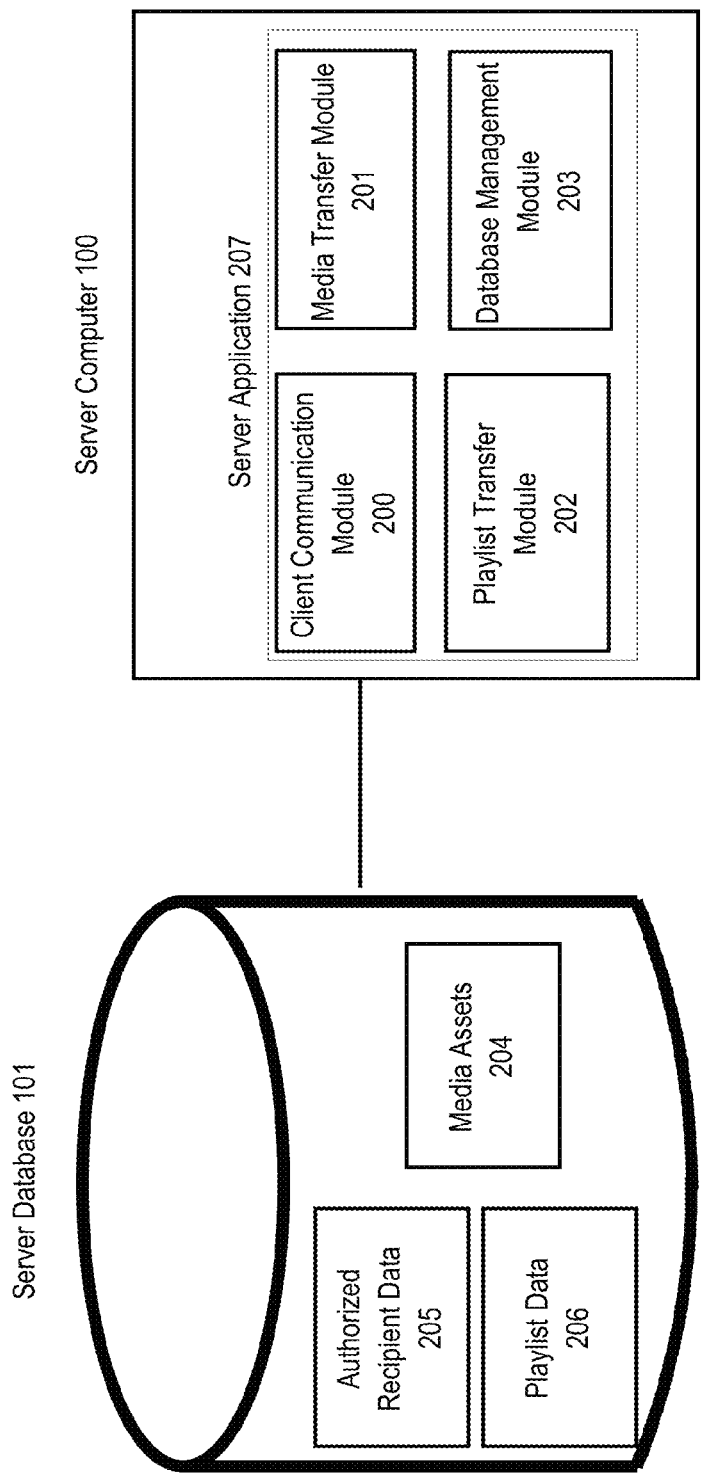
FIG. 2 illustrates a detailed view of a server computer and database according to an embodiment.

FIG. 2 illustrates a detailed view of a server computer 100 and server database 101 according to an embodiment. Although a particular configuration of modules is illustrated in FIG. 2, other embodiments can divide out the functionality of a module, combine the functionality of the modules, or contain modules that perform functions other than those described in relation to FIG. 2.

In FIG. 2, the server computer 100 includes a number of different components, including a client communication module 200, a media transfer module 201, a playlist transfer module 202, and a database management module 203. The collection of the aforementioned modules is referred to as the server application 207.

In an embodiment, the client communication module 200 represents a component of the server computer 100 that receives messages from the clients and forwards those messages to the appropriate receiving module. Furthermore, in some embodiments, the client communication module 200 authorizes the clients, such as through a username/password scheme, and maintains a session with the clients. For example, each client may be subject to permissions that limit access to particular media assets and/or playlists. Thus, the client communication module 200, after verifying the identity of a client, ensures that the server computer 100 only sends playlist information and media assets to authorized clients. In some embodiments, the client communication module 200 acts as a web server that produces interfaces for the clients to interact with to communicate with the server computer 100.

In an embodiment, the media transfer module 201 is a component of the server computer 100 responsible for transferring media to authorized clients. In an embodiment, the media transfer module 201 is configured to "push" media assets for playlists which a client is authorized to access to the associated client storage. Thus, provided that the client storage is accessible, the media transfer module 201 can access the associated storage and deposit the media assets, even if the user of the client is not currently online and/or active. Alternatively, if the associated client storage is offline or otherwise inaccessible, the media transfer module 201 transfers the media assets in response to determining that the client storage has become accessible. In an embodiment, the media transfer module 201 pushes media assets to the clients via a shared folder within their respective client storage. In some embodiments, the media transfer module 201 invokes a separate application to handle the deposit. For example, an online file sharing service or hosting service, such as DROPBOX, can be employed to perform the deposit; in other embodiments, other forms of online, networked data storage that are accessible to client computers may be used. For example, storage in a private datacenter that is accessible to the client computers can be used. In some embodiments, the media transfer module 201 determines which assets to transfer to a particular client by scanning the shared folder to determine which media assets are missing or outdated for playlists which a client is authorized to view. The media transfer module 201 then transfers the media assets which are either missing on the client or have been replaced with a newer version in the server database 101.

In some embodiments, media transfer occurs between the clients in a peer-to-peer fashion. Thus, for example, client computer 103 can share a playlist with client computer 104 and transfer the media assets utilized by the playlist to client computer 104 without sending those media assets through the server computer 100. In some peer-to-peer embodiments, the media transfer module 201 coordinates or authorizes the transfer of the media assets between the clients. Building upon the previous example, when client computer 103 shares the playlist with client computer 104, the server computer 100 authorizes the transaction by sending a message to client computer 103 and/or client computer 104 confirming that the media assets can be transferred. In some embodiments, prior to sending the authorization message, the server computer 100 confirms the identity of the clients involved in the transfer by checking credential information obtained when the clients "logged in" to their respective platforms. In other embodiments, additional credentials may be obtained before authorizing the transfer, such as presenting a security certificate that confirms the identity of the client. Many of the examples provided herein assume that the server computer 100 acts as an intermediary between the clients when transferring the media assets and/or playlists. However, those examples are equally applicable to peer-to-peer embodiments, with the clients performing the transfer themselves or under the authorization of the server computer 100.

In an embodiment, the playlist transfer module 202 represents a component of the server computer 100 responsible for transferring playlist information to the clients. In an embodiment, the playlist includes information related to the synchronization of media assets, volume levels, comments, alternative tracks, sync points for alternative tracks, volume levels of alternative tracks, and so forth. For example, the server database 101 may store a playlist that has been shared with client computer 103. As discussed above, the media transfer module 201 takes care of the transfer of the underlying media assets. The playlist transfer module 202 transfers the playlist to the client computer 103 that coincides with the media assets transferred by the media transfer module 201. As a result, the client computer 103 can combine the media assets according to the information contained in the playlist to present synchronized media. In some embodiments, the media assets are transferred by the media transfer module 201 in the background, while the playlist transfer module 202 obtains the playlist information in response to a user "logging in", selecting a particular playlist from an interface that displays the authorized playlists for that user, selecting a "refresh" widget for the list of authorized playlists, or other appropriate mechanism. In some embodiments, the playlist transfer module 202 is also responsible for receiving updates to playlists from the clients via the client communication module 200 and updating the playlist data 206 to include the changes. For example, the playlist transfer module 202 may invoke the database management module 203 to update the server database 101. However, in some embodiments the playlist transfer module 202 may utilize a file sharing service to facilitate the transfer of the playlists.

In an embodiment, the database management module 203 represents a component of the server computer 100 that manages the server database 101. For example, the server database 101 may represent a relational database and the database management module 203 may represent an application that processes requests to add, remove, or change information in the relational database. In other embodiments, the server database 101 represents a file system and the database management module 203 represents logic that controls access to the file system. In some embodiments, the management of server database 101 is provided by a database server that is separate from the server computer 100 or the management of the server database 101 may be distributed across multiple server computers.

In an embodiment, server database 101 represents one or more hardware and/or software storage components that hold information for the service provided by the server computer 100. For example, the server database 101 may represent one or more hard drives, RAIDs, random access memory (RAM), tape storages, cloud storage, data centers, databases, data warehouses, file systems, and so forth. The format in which the data is stored on the server database 101 is not critical to the techniques described herein. However, as non-limiting examples, the server database 101 may store data in relational format, object oriented format, flat file format, a file system format, and so forth.

In an embodiment, the server database 101 stores media assets 204, authorized recipient data 205, and playlist data 206. In an embodiment, media assets 204 represent video, audio, and/or multimedia files stored in virtually any format. In an embodiment, authorized recipient data 205 represents the data that specifies which of the clients are authorized to view which playlists and/or media. In an embodiment, playlist data 206 represents the data and/or metadata that indicates how to synchronize the media assets 204 into a synchronized presentation, volume levels for audio files, comments provided by the originating user or users who have been shared the playlist, and so forth.

3.2 Example Client and Storage Details

Figure 3:
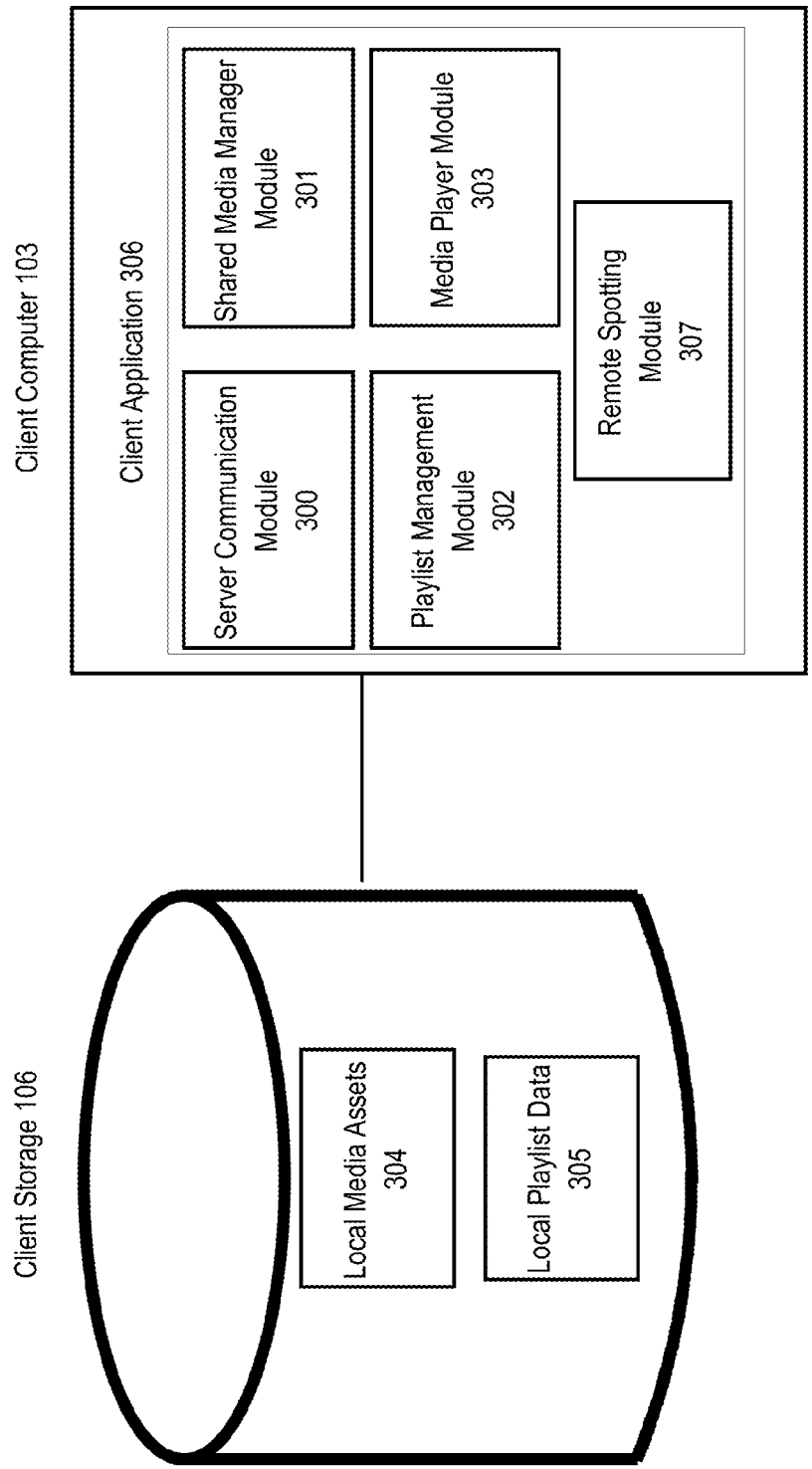
FIG. 3 illustrates a detailed view of a client computer and storage according to an embodiment.

FIG. 3 illustrates a detailed view of a client computer and storage according to an embodiment. In order to present clear examples, client computer 103 and client storage 106 are used to illustrate the detailed view. However, the details described in this section are equally applicable to client computer 104, client computer 105, and their respective storages, client storage 107, client storage 108. Although a particular configuration of modules is illustrated in FIG. 3, other embodiments may divide out the functionality of a module, combine the functionality of modules, or contain modules that perform functions other than those described in relation to FIG. 3.

In FIG. 3, the client computer 103 includes a number of different components, including a server communication module 300, a shared media manager module 301, a playlist management module 302, and a media player module 303. The collection of the aforementioned modules is referred to as the client application 306.

In an embodiment, the server communication module 300 represents a component of the client computer 103 that generates and presents interfaces for manipulation by users. In addition, the server communication module 300 is responsible for establishing a session with the server computer 100 (e.g. via a login scheme), sending messages to the server computer 100, and relaying messages from the server computer 100 to other components as appropriate. Thus, for example, when a user initially logs into the client computer 103, the server communication module 300 generates an interface that allows the user to view playlists, edit playlists, view media assets, view synchronized media presentations based on media assets and playlist information, view shared playlists, provide comments on shared playlists, adjust permissions regarding which users are allowed to view certain playlists, and so forth. In embodiments where the server computer 100 is configured to communicate with the clients as a web server, the server communication module 300 may include or represent a web browser.

In an embodiment, the shared media manager module 301 represents a component of the client computer 103 that maintains a shared portion of the client storage 106 where the server computer 100 can deposit the media assets related to playlists shared with the client computer 103. For example, the shared media manager module 301 may represent a background process that continuously waits for incoming media assets from the server computer 100 and stores those assets in the client storage 106. For example, the shared media manager module 301 may be implemented by a shared file client or utilize a file sharing service or hosting service.

In an embodiment, the playlist management module 302 represents a component of the client computer 103 responsible for retrieving playlists from the server computer 100 and updating the client storage 106 with the retrieved playlists. Furthermore, the playlist management module 302 is responsible for synchronizing the playlists with the versions in the server database 101. For example, the server computer 100 may update the playlists stored by the client storage 106 every set period of time, in response to receiving a message requesting refresh from the client computer 103, after a particular number of changes have been buffered, or any combination of the aforementioned techniques. In some embodiments, the playlist management module 302 is invoked by the server communication module 300 to request a refresh in response to a user selecting a refresh option within a user interface presented by the server communication module 300. In other embodiments, the playlist management module 302 invokes the server communication module 300 to update one or more interfaces in response to receiving an update from the server computer 100. In some embodiments, the playlist management module 302, in response to changes to a local version of the playlist stored in the client storage 106, invokes the server communication module 300 to send a message requesting the version on the server database 101 be updated. For example, playlist may be updated locally via one or more interfaces generated by the server communication module 300 and/or the media player module 303. Then, in response to detecting that a user has selected a "save" widget associated with the playlist, the playlist management module 302 updates the local copy and the server communication module 300 sends the update to the server computer 100. The transfer of the updated playlist may be performed by sending a message identifying the changes, sending a message containing the updated playlist, or may use a file sharing service for such purposes.

In an embodiment, the media player module 303 represents a component of the client computer 103 that displays and manages a media player. In an embodiment, the media player displayed by the media player module 303 can present media assets individually or as a synchronized production based on a particular playlist. Furthermore, in some embodiments, the media player module 303 is configured to receive updates to playlist data, such as synchronization information and volume levels, associated with a playlist from a user and invoke the server communication module 300 to update the playlist. In some embodiments, the media player module 303 is invoked by the server communication module 300 in response to a user selecting to present a particular media asset or a playlist via a user interface generated by the server communication module 300. For example, upon selecting a particular playlist, the server communication module 300 invokes the media player module 303 by providing the media assets and playlist data from which the media player module 303 creates the presentation.

In an embodiment, client storage 106 represents any number of hardware and/or software storage systems, such as hard drives, RAM, RAIDs, network file systems, file hosting services, and so forth. In an embodiment, client storage 106 includes a storage device or area of storage where the server computer 100 deposits media assets via the media transfer module 201. In an embodiment, the client storage 106 includes local media assets 304 and local playlist data 305. In an embodiment, local media assets 304 represent the media assets which have been stored locally by the client computer 103. Synchronization of the local media assets 304 with the media assets 204 which the client computer 103 is authorized to view is performed by the interplay between the media transfer module 201 of the server computer 100 and the shared media manager module 301 of the client computer 103. In an embodiment, local playlist data 305 represents playlists associated with the client computer 103 that have been stored locally in the client storage 106. For example, the local playlist data 305 may include playlists that have not yet been uploaded to the server computer 100 and/or playlists that have been modified locally but not yet selected for saving. The exchange and update of playlists between the playlist data 206 and the local playlist data 305 is performed by the interplay between the playlist transfer module 202 of the server computer 100 and the playlist management module 302 of the client computer 103.

4.0 Metadata and Playlist Sharing

In an embodiment, the server computer 100 is configured to allow sharing of playlists between the clients. For example, client computer 103 may create a playlist that involves video clip A, audio clip B, and audio clip C, the playlist specifying the synchronization between the assets, such as when audio clip B and audio clip C begin playing within video clip A, the relative volumes of the audio clips, and so forth. The client computer 103, via the server communication module 300, transfers the playlist to the server computer 100 where it is stored in the server database 101. In addition, the client computer 103 sends data that specifies which clients (or group of clients) are authorized to view the playlist, which the server computer 100 uses to update the authorized recipient data 205 associated with the playlist. In response, the server computer 100 invokes the media transfer module 201 to push the media assets utilized by the playlist (video clip A, audio clip B, and audio clip C), to the storage of the recipient clients. Those clients can then access the playlist via an interface generated by the server communication module 300. Furthermore, the clients can generate a synchronized media presentation by invoking the media player module 303 to combine the video clip A, audio clip B, and audio clip C, according to the playlist data. Thus, in some embodiments, the media assets are transferred and maintained separately, with the playlist indicating how those media assets are combined to form the presentation for review.

4.1 Process Flow

Figure 19:
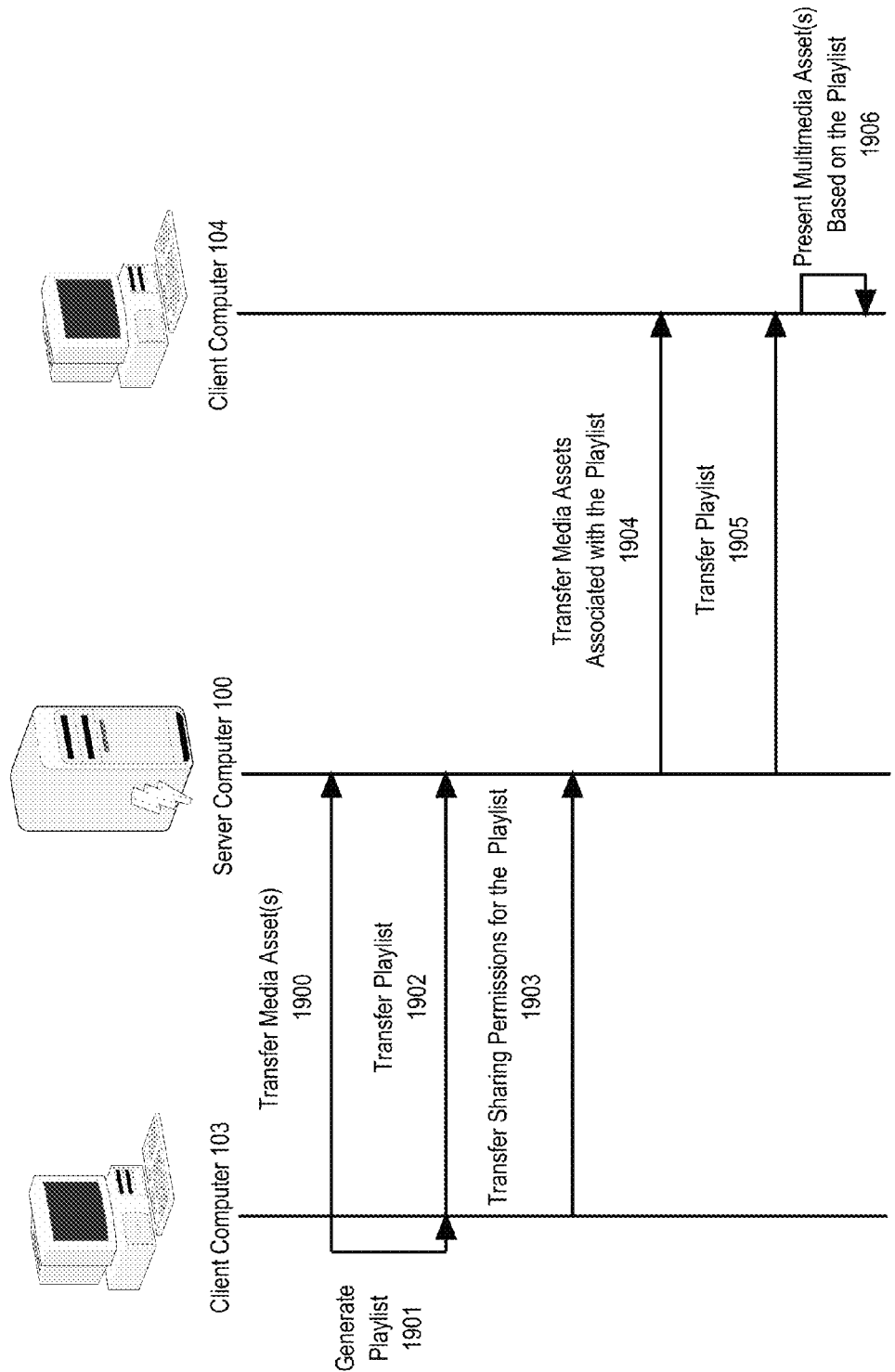
FIG. 19 illustrates a process flow for sharing playlists between clients according to an embodiment.

FIG. 19 illustrates a process flow for sharing playlists between clients according to an embodiment. FIG. 19, and each other flow diagram that is shown in this disclosure, in combination with the related text herein, is intended to describe an example of an algorithm that may be used as a basis of programming the computers described herein to perform the functions that are described. Each flow diagram and the related text also are directed to persons at a high level of skill in the relevant art. In other words, each flow diagram expresses an example algorithm at a level of detail that is believed to be sufficient, for persons of skill in this field, to understand how to program the computers described herein to implement the functions that are described, in combination with the accumulated skill and knowledge of such persons.

In FIG. 19, client 103 is depicted as sharing the playlist with client 104 as an example. However, the process depicted by FIG. 19 could be used to share playlists between any of the clients. Furthermore, FIG. 19 shows distinct steps performed by various entities, such as client computer 103, server computer 100, and client computer 104. However, in other embodiments the steps may be performed by other entities. For example, the transfer of the multimedia assets and/or playlist may be performed by a file sharing service, and thus may involve more computing devices than those depicted in FIG. 19. In addition, other embodiments may perform different steps, add steps, remove steps, or divide out steps compared to the steps illustrated in FIG. 19.

At step 1900, the client computer 103 transfers one or more media assets to the server computer 100. As described above, the media transfer between the client computer 103 and the server computer 100 can be performed in a myriad of different ways. For example, a file sharing service may be employed, that keeps one or more folders containing the media assets on the client storage 106 synchronized with one or more corresponding folders stored in the server database 101. However, in other embodiments, the server computer 100 may already contain media assets that have been uploaded by other clients or pre-installed into the server database 100. Thus, the client computer 103 may skip step 1900 if the server computer 100 already has access to the media assets.

Alternatively, the transfer of the multimedia assets may be performed by a protocol that checks whether the server computer 100 already contains the multimedia assets to be transferred and transfers only the missing assets. For instance, one or more hashes of the media files may be sent over before the transfer to establish whether the server computer 100 already has access to those files. In an embodiment, the transfer is handled by the media transfer module 201 of the server computer 100 and the shared media manager module 301 of the client computer 103. In some embodiments, the client computer 103 displays an interface for a user, which allows the user to select media assets to share. In response, the client computer 103 causes the transfer of the media assets to the server computer 100. For instance, by moving or copying those media assets to a folder synchronized by a file sharing service for eventually transmission to the server computer 100. In an alternative embodiment, all media assets are transferred to the server computer 100 for storage and access by the client computer 103 and any other clients that the client computer 103 chooses to later share the media assets with. For instance, the client computer 103 may store the media assets in one or more folders synchronized with corresponding folders within the server database 101.

At step 1901, the client computer 103 generates a playlist that identifies one or more media assets and describes how those media assets are to be presented. For example, the playlist may specify identifiers for the media assets (such as by file name), at what point within the media asset playback should begin, timings for when one media asset should begin playback compared to another asset (e.g. when a music, dialog, or sound effects should play within a corresponding video), volume levels for audio assets, frame rates for video assets, and so forth.

The playlist may be generated by receiving user input via an interface that allows media assets to be edited and synchronized. For example, the user interface may supply tools that allow users to select a base video (or multiple videos) and one or more audio assets to play within the video(s) at specific times and with various volume settings or effects. Examples of user interfaces that may be used to this effect are described later in this disclosure. The playlist is not necessarily limited to synchronizing multiple media assets. For example, a playlist may identify one a single asset, such as an audio track, and define the volume levels as well as the start and end of playback. This could be useful for editing a sound track for a specific purpose, such as the intro to a television show that should be shared with another user for review without necessarily waiting for the video portion of the intro to be completed.

At step 1902, the client computer 103 transfers the playlist to the server computer 100. As described above, the playlist transfer between the client computer 103 and the server computer 100 can be performed in a myriad of different ways. For example, the playlist may be transferred upon the client computer 103 "logging in" to the service provided by the server computer 101. As another example, the playlist may be transferred upon the client computer 103 requesting playlists to which the client computer 103 has access, such as by selecting a widget or layout associated with viewing playlists. As yet another example, a file sharing service may be employed that keeps one or more folders containing the playlists on the client storage 106 synchronized with one or more corresponding folders stored in the server database 101. In some embodiments, the client computer 103 displays an interface for a user, which allows the user to select playlists to share. In response, the client computer 103 causes the transfer of the playlists to the server computer 100. For instance, by moving or copying those media assets to a folder synchronized by a file sharing service for eventually transmission to the server computer 100. In an alternative embodiment, all playlists are transferred to the server computer 100 for storage and access by the client computer 103 and any other clients the client computer 103 chooses to later share the playlists with. For instance, the client computer 103 may store playlists in one or more folders synchronized with the server computer 100.

In some embodiments, the same interface that enables playlist sharing also triggers the media assets identified by the playlist to be shared as well. Thus, in some embodiments, the sharing of the playlist may cause the client computer 103 to transfer the media assets, such as described above in relation to step 1900. In an embodiment, the transfer is handled by the playlist transfer module 202 of the server computer 100 and the playlist management module 302 of the client computer 103.

At step 1903, the client computer 103 transfers sharing permissions for the playlist 1903. In an embodiment, the client computer 103 displays a user interface that allows a user to select playlists and set which other clients are allowed to view said playlists. For example, the user interface may provide a list of potential clients based on a list associated with the client computer 103, such as a list of friends, co-workers, clients with related tasks, a user defined list, and so forth. As another example, the user interface may accept input identifying the other clients, such as by name, identification number, email address, phone number, and so forth. In response to detecting that the permissions have been updated, the client computer 103 sends those permissions to the server computer 100, which are then recorded in the server database 101.

In some embodiments, such as those which utilize a file sharing service, the update may also cause the server computer 100 to notify the file sharing service to share the playlist and/or associated media assets or the folder containing the playlist and/or associated media assets with the other clients. The file sharing service would then keep the playlist and/or associated media assets synchronized between the clients and the server computer 100. For instance, if a change were to occur to a playlist on the part of client computer 103, the file sharing service may cause the change to be propagated to the server computer 100 and/or the clients who have permission to view the playlist. The changes may also reference other media assets, which would also be transferred in response to the change.

In order to provide clear examples, the process flow of FIG. 19 assumes the sharing permissions for the playlist identifies client computer 104. However, the same process may also be used for other clients or even multiple clients. In the case of multiple clients some or all of the steps of FIG. 19 may be performed multiple times to share the playlist and associated media assets with each client receiving permission to view the playlist.

At step 1904, the server computer 100 transfers one or more media assets identified by the playlist to the client computer 104. In an embodiment, the server computer 100 transfers the one or more media assets identified by the playlist to the client computer 104 using a file sharing service. For example, in response to step 1903, the server computer 100 may communicate that the media assets or folder containing the media assets is to be shared with the client computer 104. Alternatively, the server computer 100 may move the one or more media assets to a folder that is already configured to be shared with the client computer 104. In an embodiment, the transfer is handled by the media transfer module 201 of the server computer 100 and the shared media manager module 301 of the client computer 104.

At step 1905, the server computer 100 transfers the playlist to the client computer 104. In an embodiment, the server computer 100 transfers the playlist to the client computer 104 when the client computer 104 is active, such as "logging in" or selecting a layout or widget within a user interface generated by the server communication module 300. In an embodiment, the server computer 100 transfers the playlist to the client computer 104 using a file sharing service. For example, the server computer 100 may communicate that the playlist or folder containing the playlist is to be shared with the client computer 104. Alternatively, the server computer 100 may move the playlist to a folder that is already configured to be shared with the client computer 104. In an embodiment, the transfer is handled by the playlist transfer module 202 of the server computer 100 and the playlist management module 302 of the client computer 104.

At step 1906, the client computer 104 presents the one or more media assets based on the playlist. In an embodiment, the client computer 104 presents the one or more media assets using the media player module 303 of the client computer 104. For example, the client computer 104 may present an interface through which a user can select the shared playlist for playback. In response, the client computer 104, via the media player module 303, presents the one or more media assets according to the settings, timings, and other data specified by the playlist. In some cases, presenting the media assets involves combining or synchronizing multiple video and/or audio assets into a particular production.

Alternatively, in the case of a single media asset, the presentation may play a clip of the asset based on starting and ending times specified by the playlist as well as other settings, such as volume levels. Examples of interfaces for selection of a playlist and presentation of the video are provided later in this disclosure. In some embodiments, the client computer 104 is configured to present an interface that allows the client computer 104 to create alternative versions of the playlist or provide comments on the playlist, which are then transferred to the server computer 100 and/or client computer 103 (and/or other clients who have permission to view the playlist). Thus, the client computer 103, may present the alternate versions of the playlist and/or comments in one or more interfaces. Examples of interfaces that allow for the creation of alternative versions of playlists and/or add comments regarding a shared playlist are described later in this disclosure.

4.2 Sharing Examples

Figure 20:
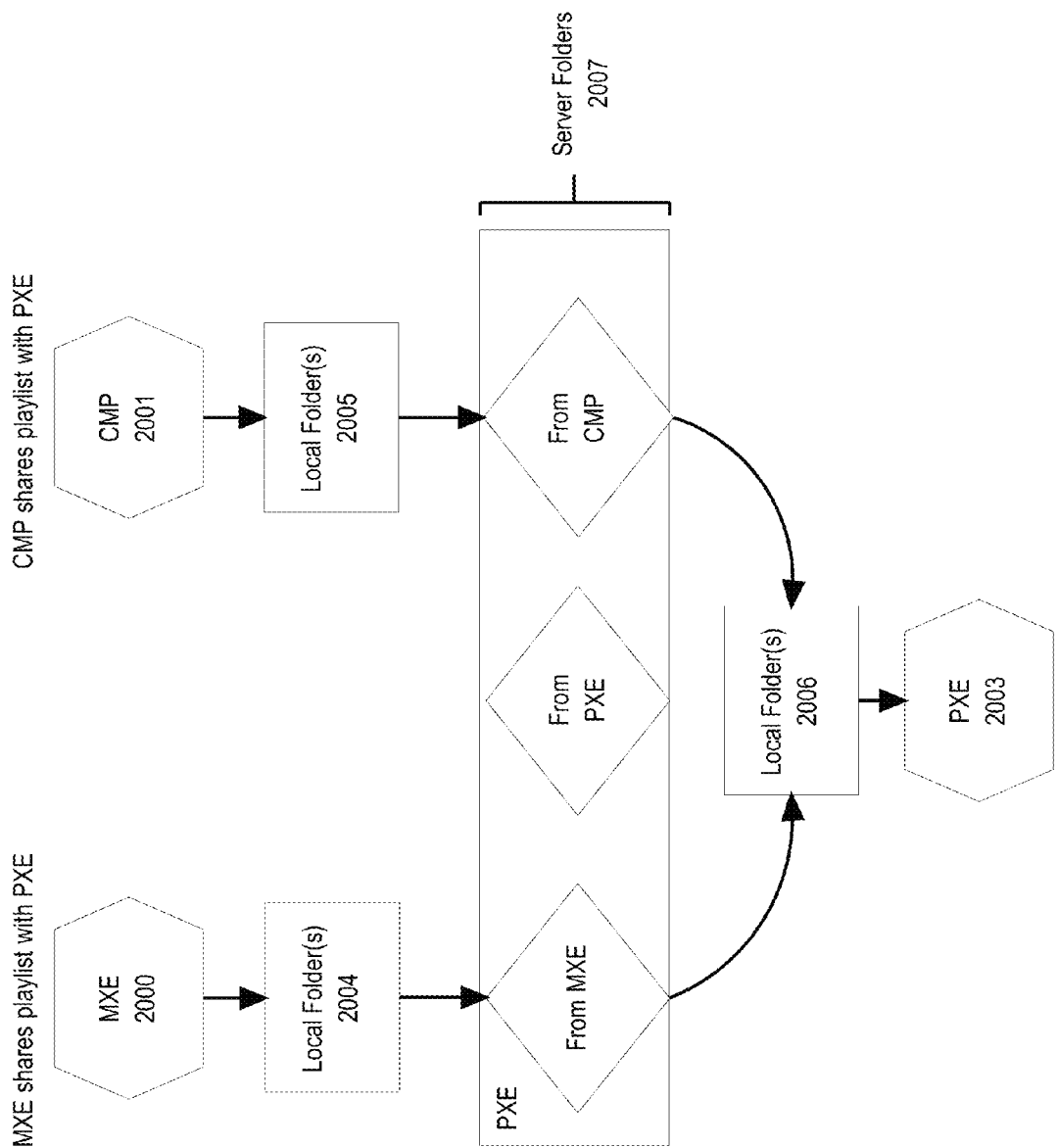
FIG. 20 illustrates an example sharing flow schema according to an embodiment.

FIG. 20 illustrates an example sharing flow schema 2000 according to an embodiment. In FIG. 20, instead of referring to clients, FIG. 20 refers to client groups or roles, such as "MXE" representing clients associated with the role of music editors, "CMP" representing clients associated with the role of 'composers', and so forth. When discussing FIG. 20, the role names will be used. However, the roles are representative of client computers, such as client computer 103, client computer 104, and client computer 105. Although not explicitly illustrated in FIG. 20, the server computer 100 is assumed to handle the transfer of playlists and media assets between the clients. Furthermore, FIG. 20 illustrates the sharing of the playlist, the media assets are assumed to be transferred as described above in reference to the media transfer module 201 and shared media manager module 301. In some cases, where more than one client share a role, steps of the sharing are repeated for each client within a group to which a playlist is shared.

In FIG. 20, the MXE 2000 shares a first playlist with the PXE 2003. For example, as a result of the MXE 2000 selecting to share the playlist with the PXE 2003 via a user interface. In response, the MXE 2000 moves the playlist (and in some embodiments the associated media assets) into local folder(s) 2004 within an associated client storage. A file sharing service is then used to synchronize the playlist and/or media assets in the local folder(s) 2004 with a corresponding location in the server folders 2007 stored within the server database 101. In some embodiments, the server folders 2007 are divided by recipient and sharer. For example, the server folders 2007 may include a folder for each client or client group (PXE 2003, MXE 2000, CMP 2001, etc.) with subfolders for assets and files received from each other client or client group. Thus, since this example involves the MXE 2000 sharing with the PXE 2003, the corresponding location in the server folders 2007 is within the folder "PXE" and the sub-folder "From MXE". This location within the server folders 2007 is then synchronized with the local folder(s) 2006 of the PXE 2003. Although FIG. 20 only shows the folder for the PXE 2003 in the server folders 2007 to avoid obscuring the illustration, a practical environment may have a folder for each client or client group. Thus, if the PXE 2003 were to share a playlist with the MXE 2000, the location within the server folders 2007 would be the folder "MXE" and subfolder "From PXE". The PXE 2003 may then access the first playlist and/or associated media assets to begin playback, provide edits, create alternative versions, provide comments, and so forth.

In addition, the CMP 2001 shares a second playlist with the PXE 2003. For example, as a result of the CMP 2000 selecting to share the playlist with the PXE 2003 via a user interface. In response, the CMP 2000 moves the playlist (and in some embodiments the associated media assets) into local folder(s) 2005 within an associated client storage. A file sharing service is then used to synchronize the playlist and/or media assets in the local folder(s) 2005 with a corresponding location in the server folders 2007 stored within the server database 101. In this case, the CMP 2001 is sharing with the PXE 2003, thus the corresponding location in the server folders 2007 is within the folder "PXE" and the sub-folder "From CMP". This location within the server folders 2007 is then synchronized with the local folder(s) 2006 of the PXE 2003. The PXE 2003 may then access the second playlist and/or associated media assets to begin playback, provide edits, create alternative versions, provide comments, and so forth.

In some embodiments, the local folder(s) 2004, 2005, 2006 are each configured to include folders representing files sent to and/or received from each other client or client group. For example, local folder(s) 2004 may include folders for "PXE", "CMP", etc., which represent files shared with the corresponding client. As another example, the folders may be established with a finer granularity, such as including "to PXE", "from PXE", "to CMP", "from CMP", etc., folders to separate files based on whether they were sent to or received from the associated client. Furthermore, the server folder(s) 2006 may also be established at the above level of granularity. In some embodiments, the granularity of the folders between the local folder(s) 2004, 2005, 2006 of the clients and the server folders 2007 is the same to establish a clear correlation between local folder(s) 2004, 2005, 2006 and the server folders 2007. For example, playlists and assets shared by the MXE to the PXE may initially be stored in a "MXE to PXE" folder in local folder(s) 2004, which is then synchronized with a "MXE to PXE" folder in server folders 2007, which is then synchronized with a "MXE to PXE" folder in local folder(s) 2006.

4.3 Server File System Example

Figure 23:
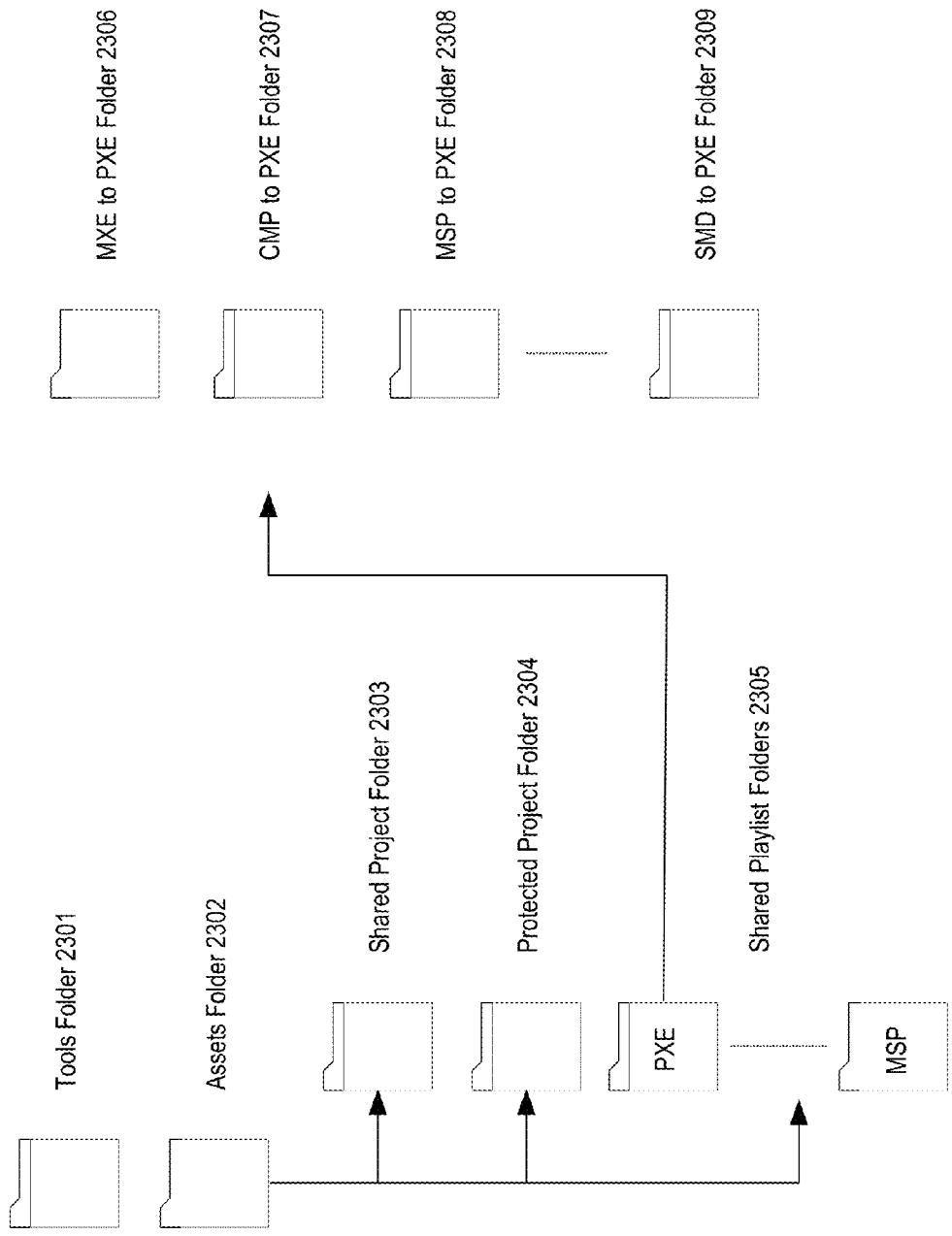
FIG. 23 illustrates an example server file system that may be implemented by server database.

FIG. 23 illustrates an example server file system 2300 that may be implemented by server database 101. Although FIG. 23 illustrates only a specific number and/or types of folders, a practical environment may have more folders, less folders, folders organized in a different hierarchy, or different types of folders than those illustrated in FIG. 23.

In FIG. 23, the server file system 2300 includes a number of folders some which are accessible to all clients and others that are only accessible to particular clients or groups of clients. The tools folder 2301 stores tools and/or user manuals that are available to all clients of the service provided by the server computer 100. The assets folder 2302 is a folder that stores media assets 204, authorized recipient data 205, and playlist data 206 for all users, although select sub-folders of the asset folder 2303 may only be available to specific users or groups of users. In FIG. 23, the assets folder 2302 is divided into a shared project folder 2303, a protected project folder 2304, and shared playlist folders 2305. The shared project folder 2303 includes media assets 204 and playlist data 206 that is shared with all users who are assigned to the same project. In some embodiments, authorized recipient data 205 for the shared project folder 2303 is not necessary since it is assumed any client who is marked within the server database 101 as working on the project has been given permission to access the contents of the shared project folder 2303. The protected project folder 2304 is a folder for the project, and thus includes media assets 204 and playlist data 206, but is also associated with authorized recipient data 205 so that the contents of the folder are only shared with authorized clients.

The shared playlist folders 2305 represent the folders of individual clients or client groups, each of which includes files or sub-folders that belong to the client/client group, received from other clients/client groups, or shared with other clients/client groups. Thus, each of the shared playlist folders 2305 may include a number of sub-folders, each of which include their own media assets 204 and/or playlist data 206 as well as being associated with their own authorized recipient data 205. In FIG. 23, the PXE folder is used to display example contents, which includes sub-folders for the playlists and/or media assets shared by each of the other clients, such as the MXE to PXE folder 2306, CMP to PXE folder 2307, MSP to PXE folder 2308, SMD to PXE folder 2309, and so forth. Although the PXE folder is used as an example, the same general structure can be applied to any client or client group.

In some embodiments, all media assets are stored in a common location to avoid duplication across the individual folders. Thus, in such embodiments, clients are assumed to have permission to access all the base media assets or are assumed to have permission to view select media assets if already granted permission to view a playlist that references the select media assets. In addition, in such embodiments, the file sharing service may be configured to allow specific files to be flagged for synchronization with the local storage of the clients, rather than sharing entire folders.

5.0 Production Overview Interface

In order to clearly illustrate examples, the interfaces are assumed to be generated and displayed by client computer 103. However, the example interfaces can also be generated and displayed by other clients, such as client computer 104 and client computer 105. The term "widget" stands for a user interface element that can be selected to cause the recited effect. Example widgets include buttons, dropdown menus, radio buttons, forms, sliders, checkmark boxes, or another other user interface element. The exact type of widget used for each described feature is not critical.

Figure 4:
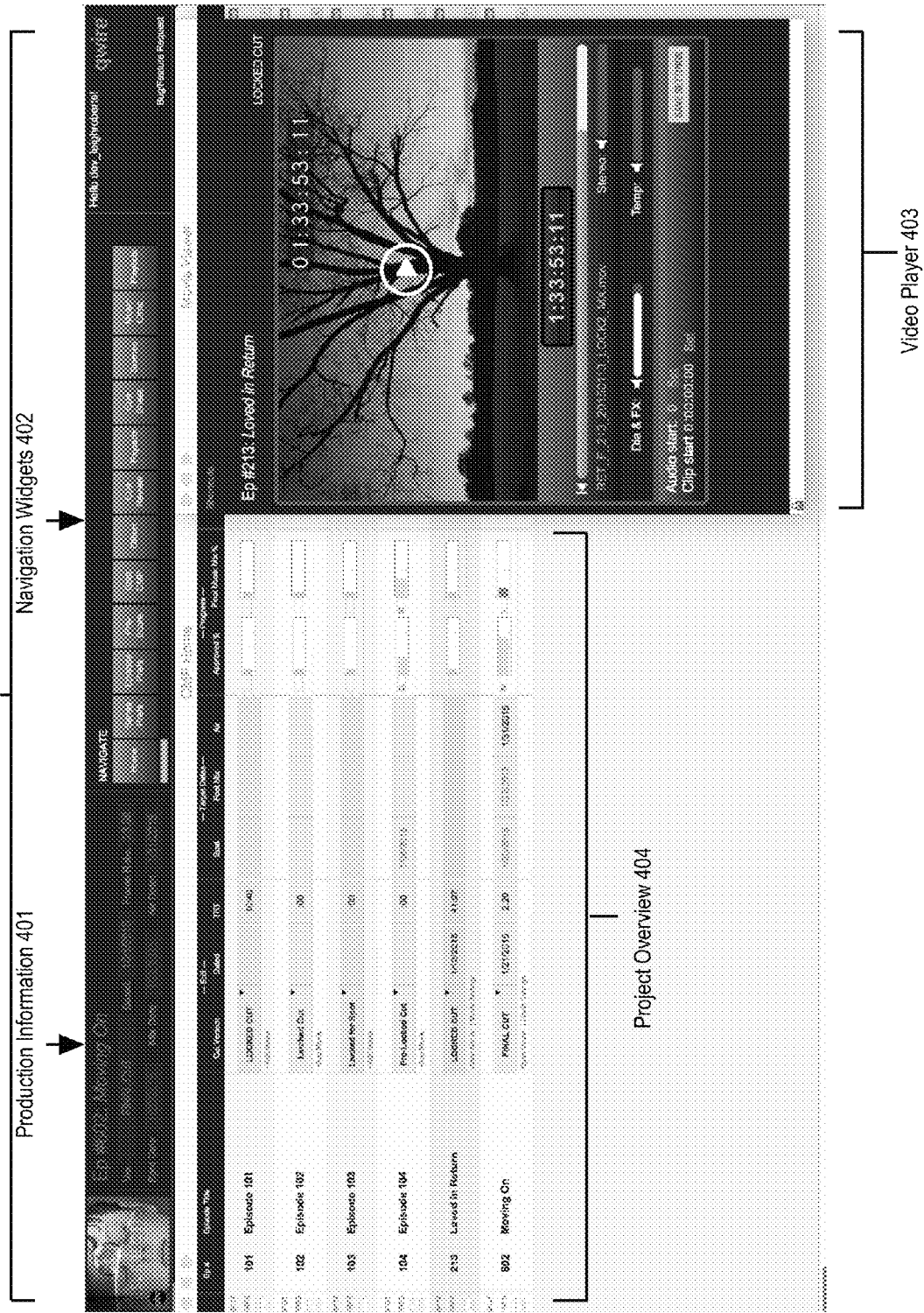
FIG. 4 illustrates a production overview interface according to an embodiment.

FIG. 4 illustrates a production overview interface 400 according to an embodiment. In FIG. 4, the production overview interface 400 includes production information 401, navigation widgets 402, media player 403, and project overview 404. In an embodiment, the production overview interface 400 is displayed by client computer 103 as a "home" view of the client application 306 upon the user "logging in" to the client application 306.

In an embodiment, the production information 401 contains information related to the currently selected project, which may include project title, version information, date of last edit, frame rate, mix date, spot date, air date, logo, and so forth.

In an embodiment, the navigation widgets 402 represent options presented to the user that control the current interface displayed by the client application 306. For example, the client application 306 may offer additional features such as series preferences, episode preferences, spotting, cue sheet management, and so forth that can be accessed via the navigation widgets. The aforementioned features may be provided by additional modules that are not explicitly displayed in FIG. 3 as being part of the client application 306.

In an embodiment, the media player 403 represents a player generated by the media player module 303. In some embodiments, the media player 403 is embedded into the production overview interface 400. However, in other embodiments, the media player 403 is a window that can be moved and/or manipulated separately from the production overview interface 400. In some embodiments, the media player 403 is presented using an application other than the client application 306, such as an Internet browser. In some embodiments, the project for which the media player 403 is generated is determined based on the currently selected project and/or as a result of receiving user selection of a particular project from the project overview 404.

In an embodiment, the project overview 404 contains information and widgets for projects available to the client computer 103. For example, the project overview 404 may contain reference numbers for the projects, titles for the projects, versions for the projects, edit dates for the projects, spotting dates for the projects, post mix dates for the projects, air dates for the projects, progress reports for the projects, and so forth. In an embodiment, to change the currently selected project, the user selections (e.g. "double clicks") on the row representing the project. In other embodiments, the production overview interface 400 contains a widget displayed in association with each project whose selection changes the current project to the project associated with the selected widget.

6.0 Video Player Interface

Figure 5:
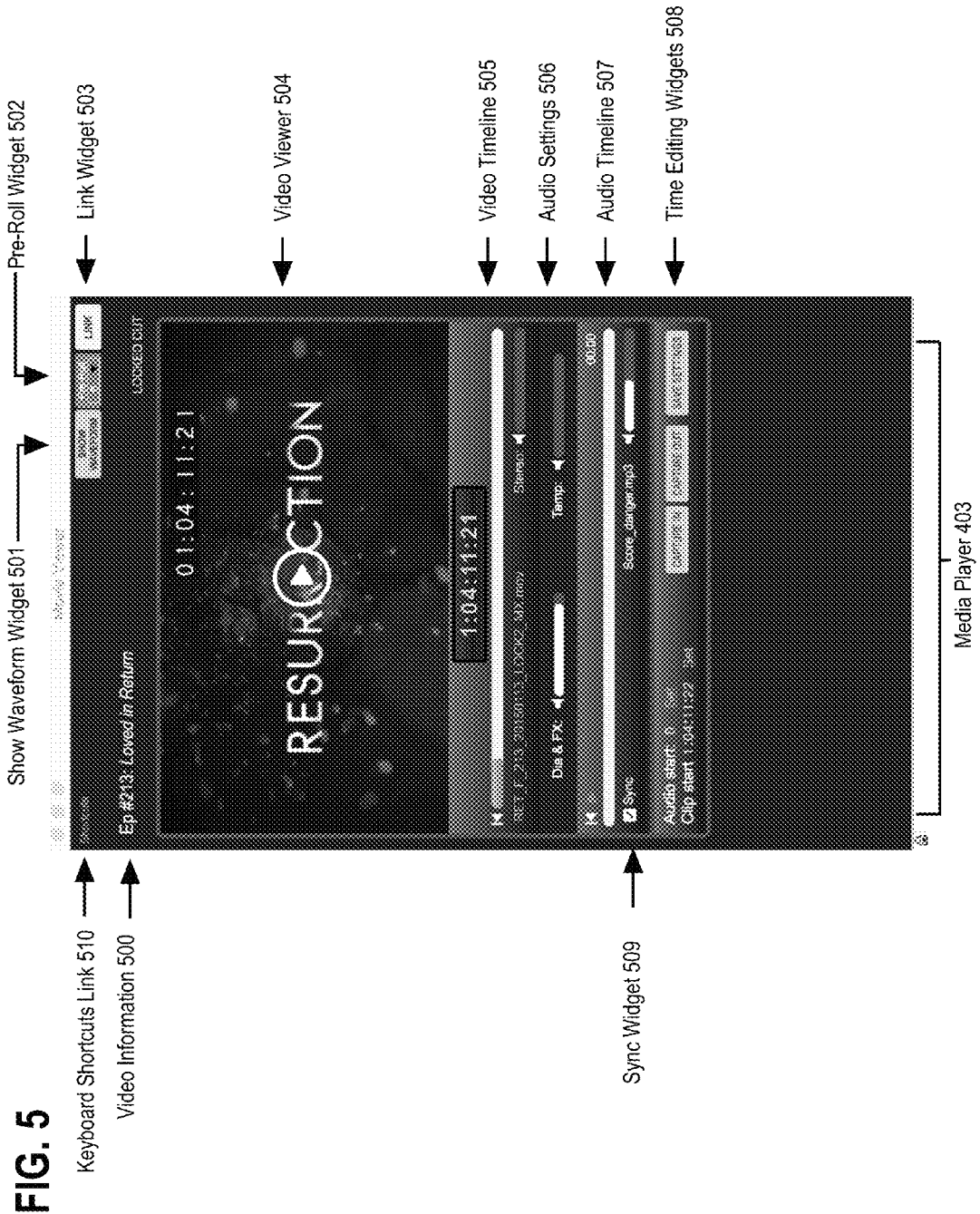
FIG. 5 illustrates a detailed view of a media player according to an embodiment.

FIG. 5 illustrates a detailed view of the media player 403 according to an embodiment. In FIG. 5, the media player includes video information 500, show waveform widget 501, pre-roll widget 502, link widget 503, video viewer 504, video timeline 505, audio settings 506, audio timeline 507, time editing widgets 508, sync widget 509, and keyboard shortcuts link 510.

In an embodiment, video information 500 includes identifying information for the project, such as the title, reference number, logo, and so forth.

In an embodiment, the pre-roll widget 502 is configured to allow a user to enter a time value before the sync-point at which to begin playback. Thus, the pre-roll widget controls the offset at which the audio clip begins to play relative sync point into the video. In some embodiments, the value entered via the pre-roll widget 502 updates the local playlist data 305 associated with the current playlist.

In an embodiment, the link widget 503 invokes the server communication module 300 to display an interface from which the playlist and/or media assets currently being presented by the media player 403 can be shared with other clients.

In an embodiment, video viewer 504 represents a region of the media player 403 where the video playback is displayed.

In an embodiment, video timeline 505 is a timeline which represents where the playback of the video clip is in relation to the full duration of the video clip. In an embodiment, the current playback position of the video clip can be manipulated by selecting the position of the video timeline 505 that correlates to the time to which the playback should be skipped.

In an embodiment, audio settings 506 includes one or more widgets that control the volume of different audio assets being played concurrently with the video asset presented via the video viewer 504. For example, the audio settings 506 may include options to change the volume of the temporary music, the sound effects, the dialog, mono right, mono left, stereo, and so forth. In some embodiments, the video clip includes an embedded audio track and the audio settings 506 also include options for adjusting the volume of the embedded audio track. In some embodiments, certain settings of the audio settings 506 are located in other areas of the media player 403. For example, in FIG. 5, the audio timeline 507 is displayed for an audio clip and includes a volume slider for adjusting the volume of the audio clip. Thus, while that volume slider is not located adjacent to the remainder of the audio settings 506 displayed in FIG. 5, the slider is still logically part of the audio settings 506.

In an embodiment, the audio timeline 507 illustrates the current playback of an audio clip in relation to the entire duration of the audio clip. In an embodiment, the current playback position of the audio clip can be manipulated by selecting the position of the video timeline 505 that correlates to the time to which the playback should be skipped.

Figure 6:
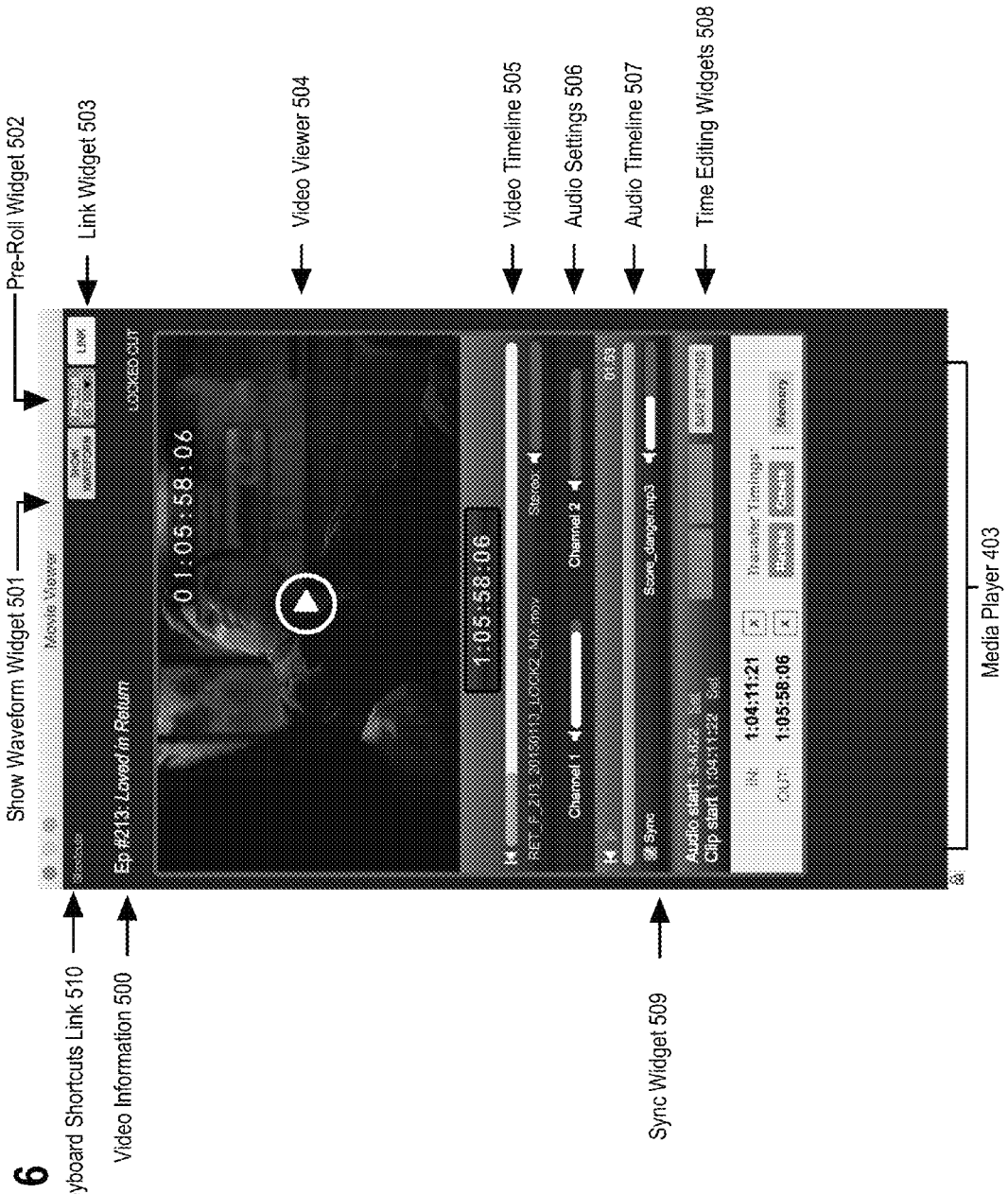
FIG. 6 illustrates time editing controls for a media player according to an embodiment.

In an embodiment, time editing widgets 508 control the synchronization between the audio clip and the video clip. FIG. 6 illustrates a view of the media player 403 where the time editing widgets 508 are extended. In FIG. 6, the time editing widgets 508 include an audio start time and a clip start time that can be manipulated to identify at which point in the video clip and audio clip the relative playbacks should begin. Furthermore, the time editing widgets 508 are configured to allow manipulation of the timings by allowing the user to specify an "in" time and an "out" time for the audio clip. The "in" and "out" times represent when in the playback of the video the audio clip should begin and end. In an embodiment, the time editing widgets 508 include a button that allows the "in" and "out" times to be revised, a button to create new "in" and "out" times, and a button that allows the time codes to be copied to memory, such as a clipboard of an operating system.

Figure 8:
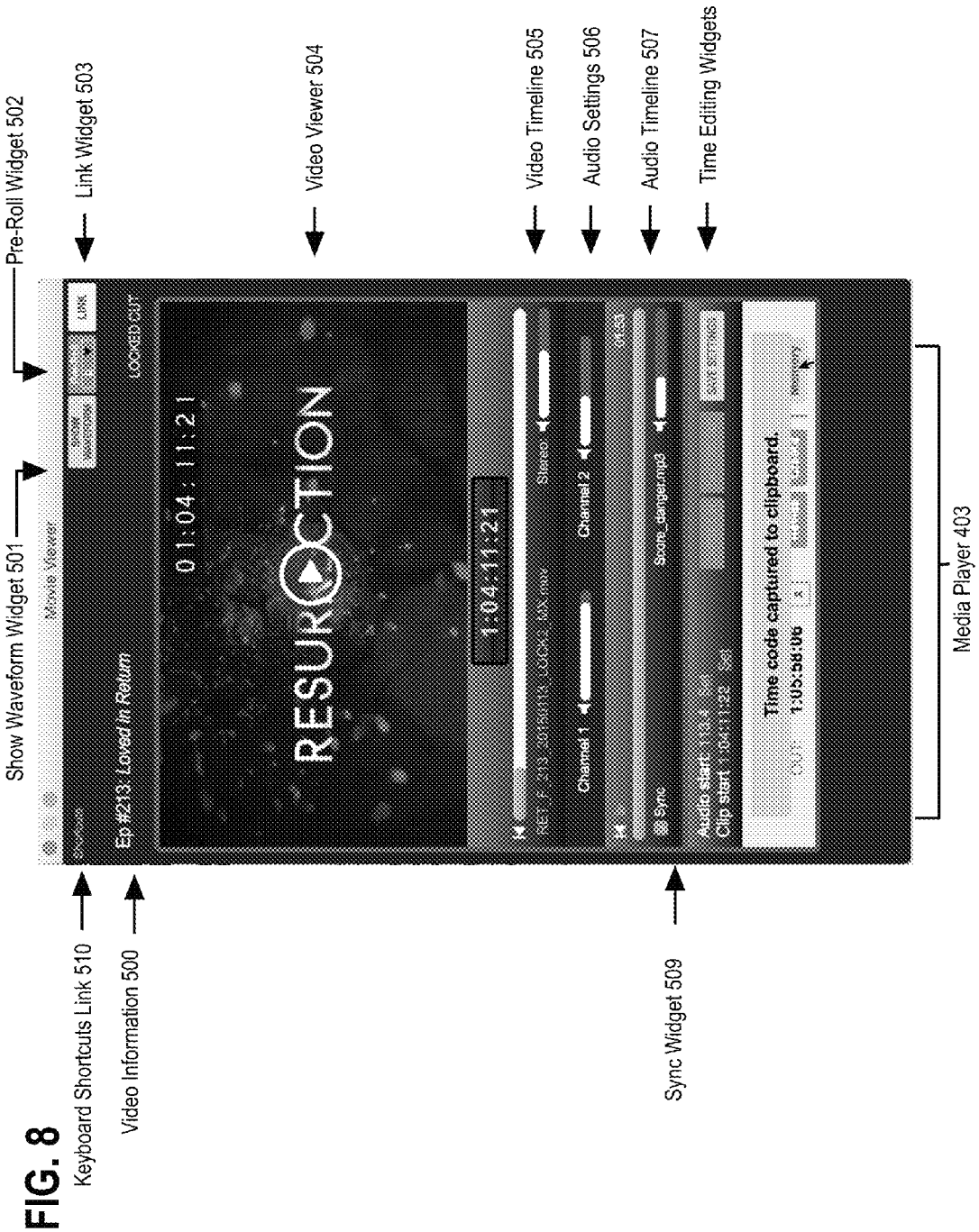
FIG. 8 illustrates a copy confirmation for a media player according to an embodiment.
Figure 9:
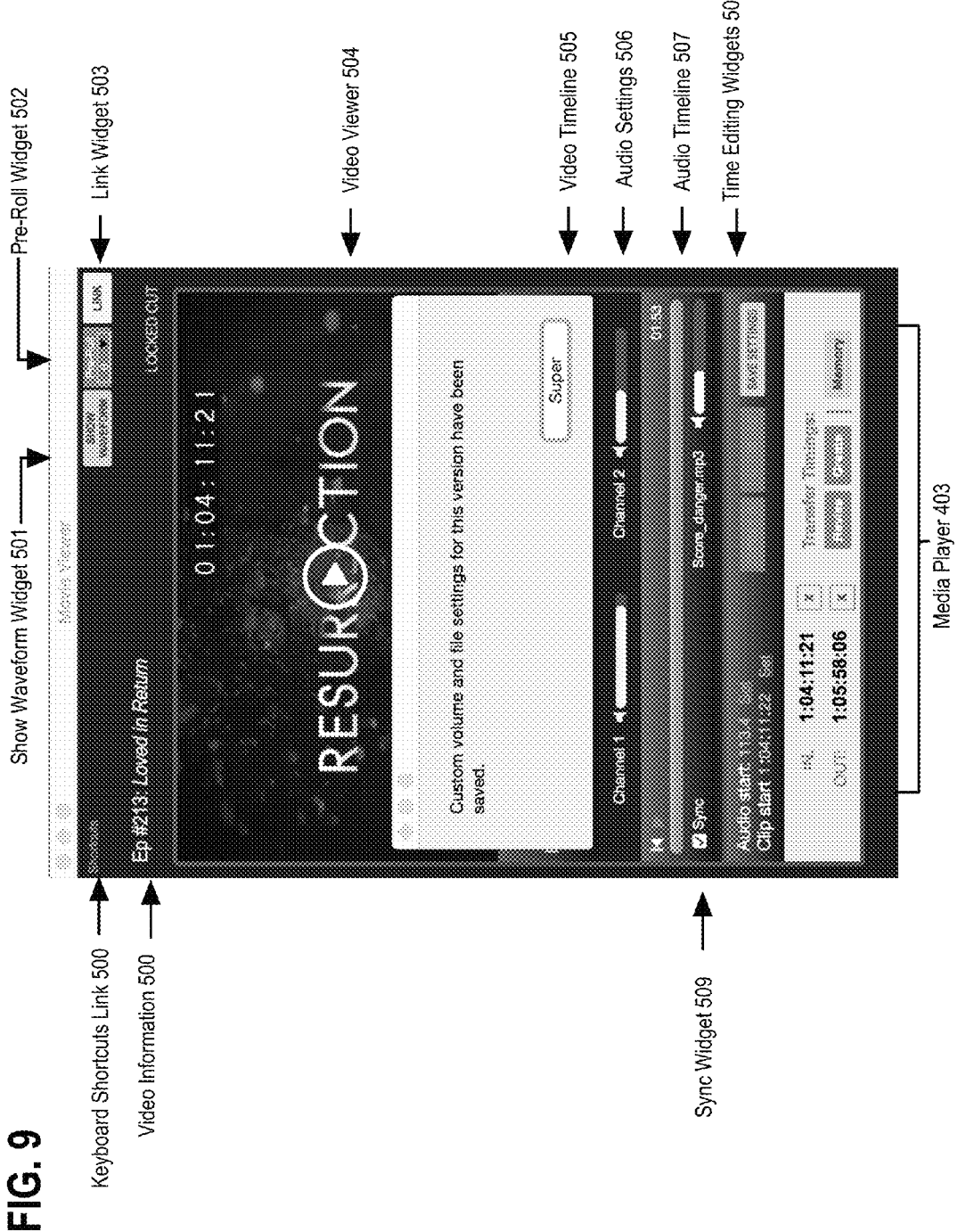
FIG. 9 illustrates a save confirmation for a media player according to an embodiment.

In an embodiment, new time codes for the "in" and "out" times can be entered as time values in a field, or specified by clicking on the video timeline 505 to specify "in" and "out" times. FIG. 8 illustrates a copy confirmation message for the media player 403 according to an embodiment. In FIG. 8, the copy confirmation message informs the user that the time codes have been captured to clipboard. In some embodiments, the time editing widgets 508 includes a "save settings" button that finalizes changes to the local playlist data 305 and causes the changed playlist to be uploaded to the server computer 100. FIG. 9 illustrates a save confirmation for the media player 403 according to an embodiment. In FIG. 9, the media player 403 displays a message that the user that the custom volume and file settings for the current version have been saved. In some embodiments, the "capture in" and "capture out" widgets allow the user to import the current timing of the video displayed in the video viewer 504 as the in time and out time respectively. Thus, while watching the video, the user can capture the in time and out time to use for a music cue. This can be used to create a new music cue or to edit an already existing music cue.

In an embodiment, sync widget 509 controls whether the video clip and/or audio clip(s) are to be locked to synchronization based on the local playlist data 305 or can be manipulated via the video timeline 505, audio timeline 507. For example, while the sync widget 509 is active, the playback of the audio clip and the video clip are locked in sync, thus manipulating one automatically manipulates the other. However, while the sync widget 509 is deactivated, the playback of the video clip and audio clip can be adjusted separately.

Figure 10:
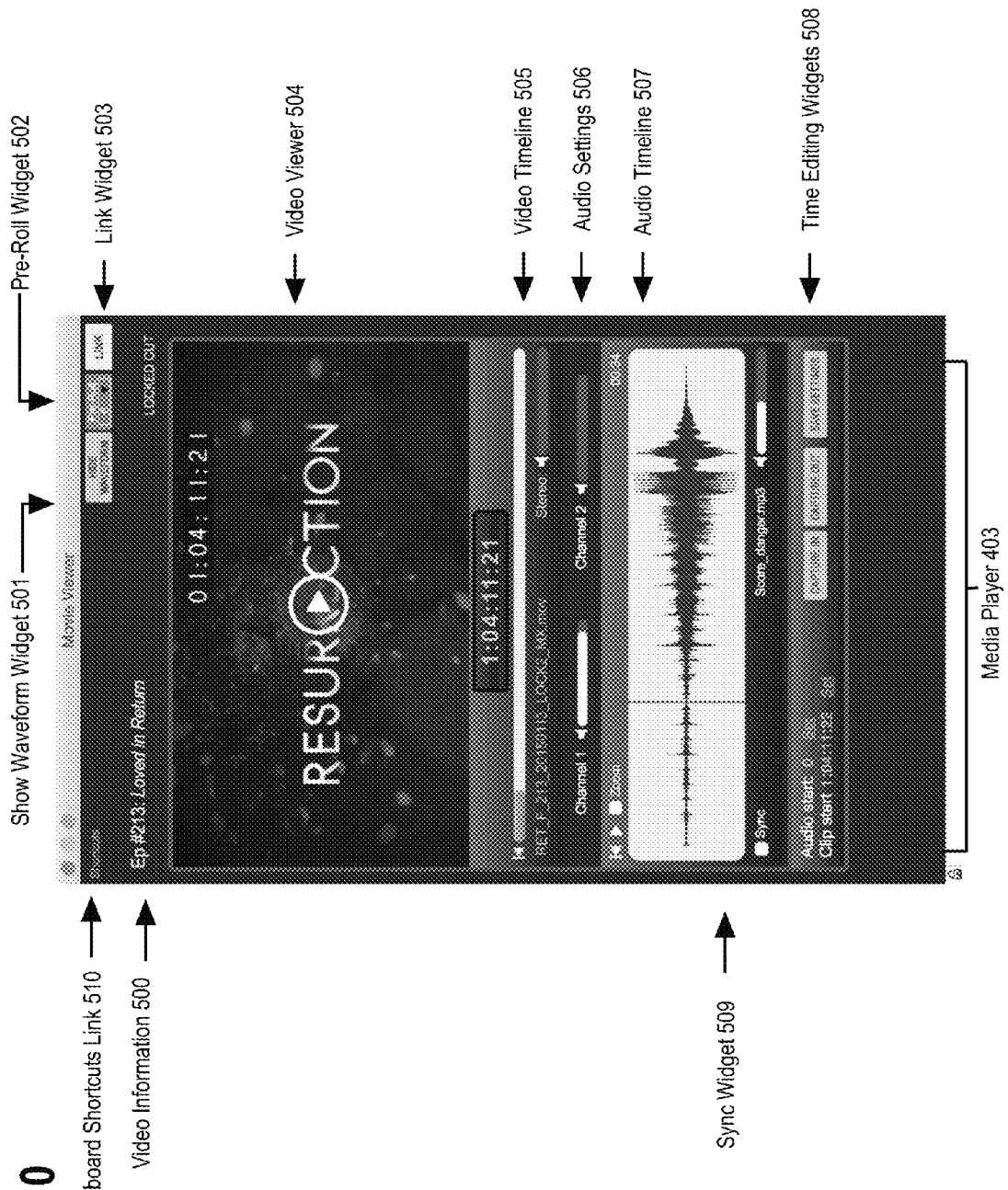
FIG. 10 illustrates a waveform view for a media player according to an embodiment.

In an embodiment, the show waveform widget 501 represents a widget that causes the media player 403 to display a view of the waveform associated with an audio clip. FIG. 10 illustrates an example view of the media player 403 where the show waveform widget 501 has been selected. In FIG. 10, the audio timeline 507 has been replaced with a view of a waveform representing the audio clip. As with the original view of the audio timeline 507, the current position with the audio clip can be adjusted by moving the horizontal bar across the waveform. In some embodiments, the addition of the waveform view provides additional information to the user, but the functionality of the audio timeline 507 and manipulation via the time editing widgets 508 remains the same. In some embodiments, the media player 403 displays concurrently with the waveform widgets which allow the in time and out time of the music track to be selected. For example, the user may adjust the current position within the waveform by selecting a time within the waveform (such as by clicking the portion of the waveform corresponding to the desired time) and using the widgets to set the start or the end time within the music track to where the current time.

Figure 7:
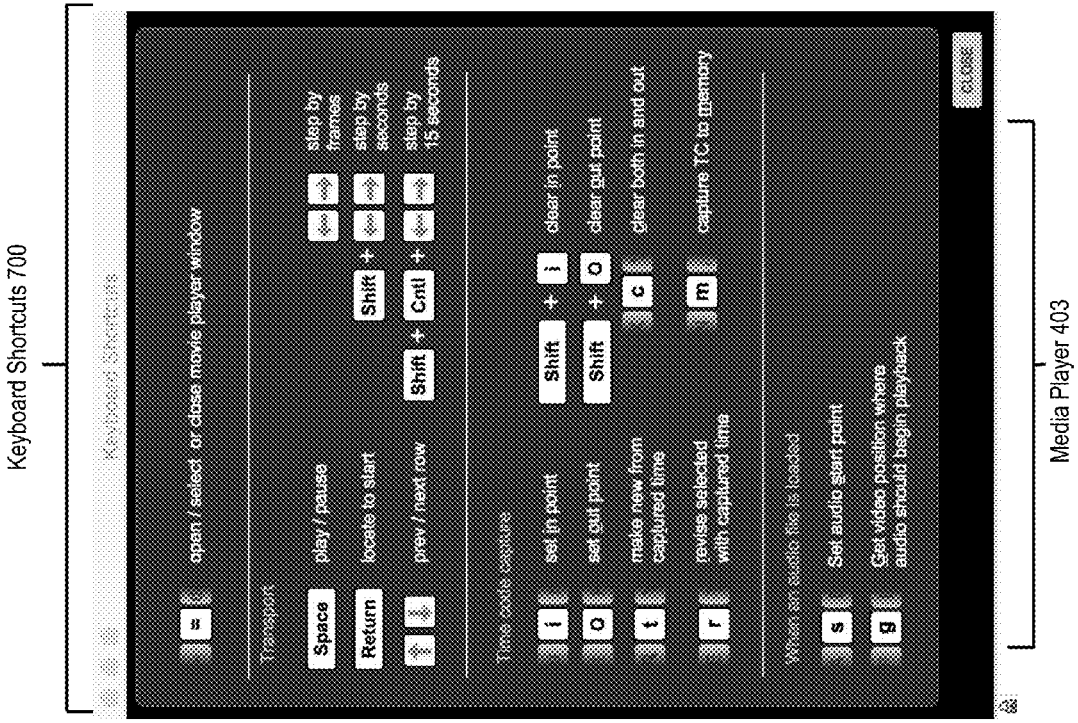
FIG. 7 illustrates keyboard shortcuts for a media player according to an embodiment.

In an embodiment, keyboard shortcuts link 510, upon being selected by a user, causes the media player 403 to display a keyboard shortcut screen that specifies the keyboard shortcuts supported by the media player 403. FIG. 7 illustrates example keyboard shortcuts 700 for the media player 403 according to the embodiment. For example, "=" can open/select or close the window of the media player 403, "space" can pause/resume playback, "i" sets an in point to the current playback position, and so forth.

In some embodiments, where the video clip is synchronized with multiple audio clips, the media player 403 displays additional audio timelines, volume controls, and time editing widgets to separately manipulate the playback and synchronization of each audio clip with the video clip.

7.0 Spotting To Video Player Interface

Figure 22:
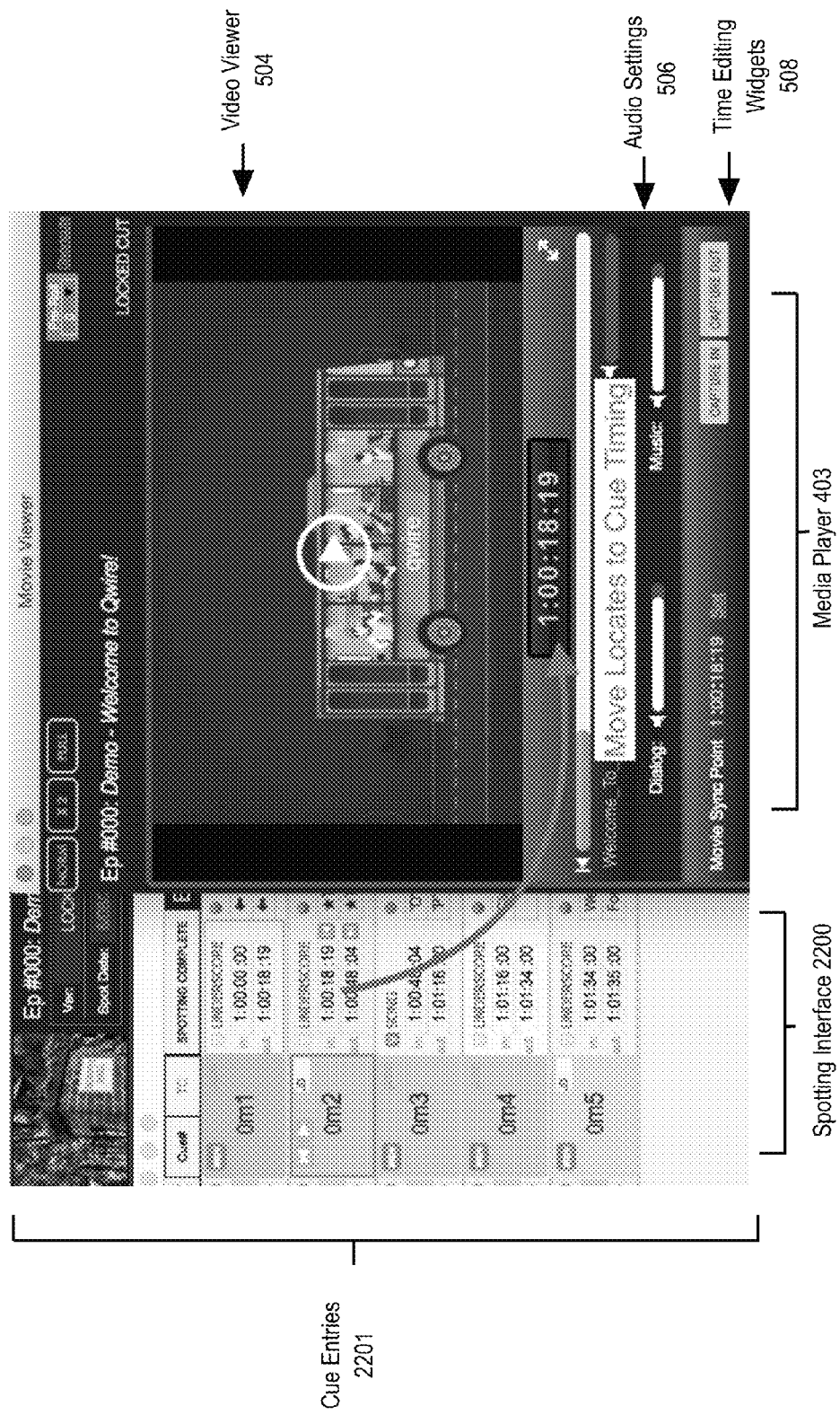
FIG. 22 illustrates an example of transferring timings from a spotting interface to a media player according to an embodiment.

FIG. 22 illustrates an example of transferring timings from a spotting interface 2200 to a media player 403 according to an embodiment. In FIG. 22, spotting interface 2200 identifies a number of cue entries 2201 identifying in and out times for a number of audio tracks that can be synchronized with a video asset. In some embodiments, the spotting interface 2200 allows the user to create a playlist indicating when each audio track should play within the video asset. For example, the spotting may be performed in any of the manners described in, "Collaborative Production Asset Management" by Roberts et al., U.S. Pat. No. 8,867,905 B2, which is incorporated by reference for all purposes as though fully stated herein.

The media player 403 presents the aforementioned video asset and includes elements described above with respect to the media player 403, such as video viewer 504, audio settings 506, and time editing widgets 508. In an embodiment, the spotting interface 2200 and the media player 403 are configured to allow selection of a particular cue to update the media player 403 and the associated settings (audio settings 506, time editing widgets 508, video viewer 504) to the timings and settings of the selected track. For example, this may be accomplished by selection of an associated widget, such as a button, or by "clicking and dragging" the audio track from the spotting interface 2200 to the media player 403. In response, the video viewer 504 is updated to the point in time where the audio is set to begin and the audio settings 506 and time editing widgets 508 are populated with the volume settings and timings of the associated audio track. In some embodiments, when finished editing the synchronization between the video asset and the selected track via the audio settings 506 and/or time editing widgets 508, the media player 403 is configured to allow those settings to be exported back to the spotting interface 2200. For example, by selecting an "export" widget or by "clicking and dragging" the name of the track back to the spotting interface 2200.

8.0 Playlist Review Interface

Figure 11:
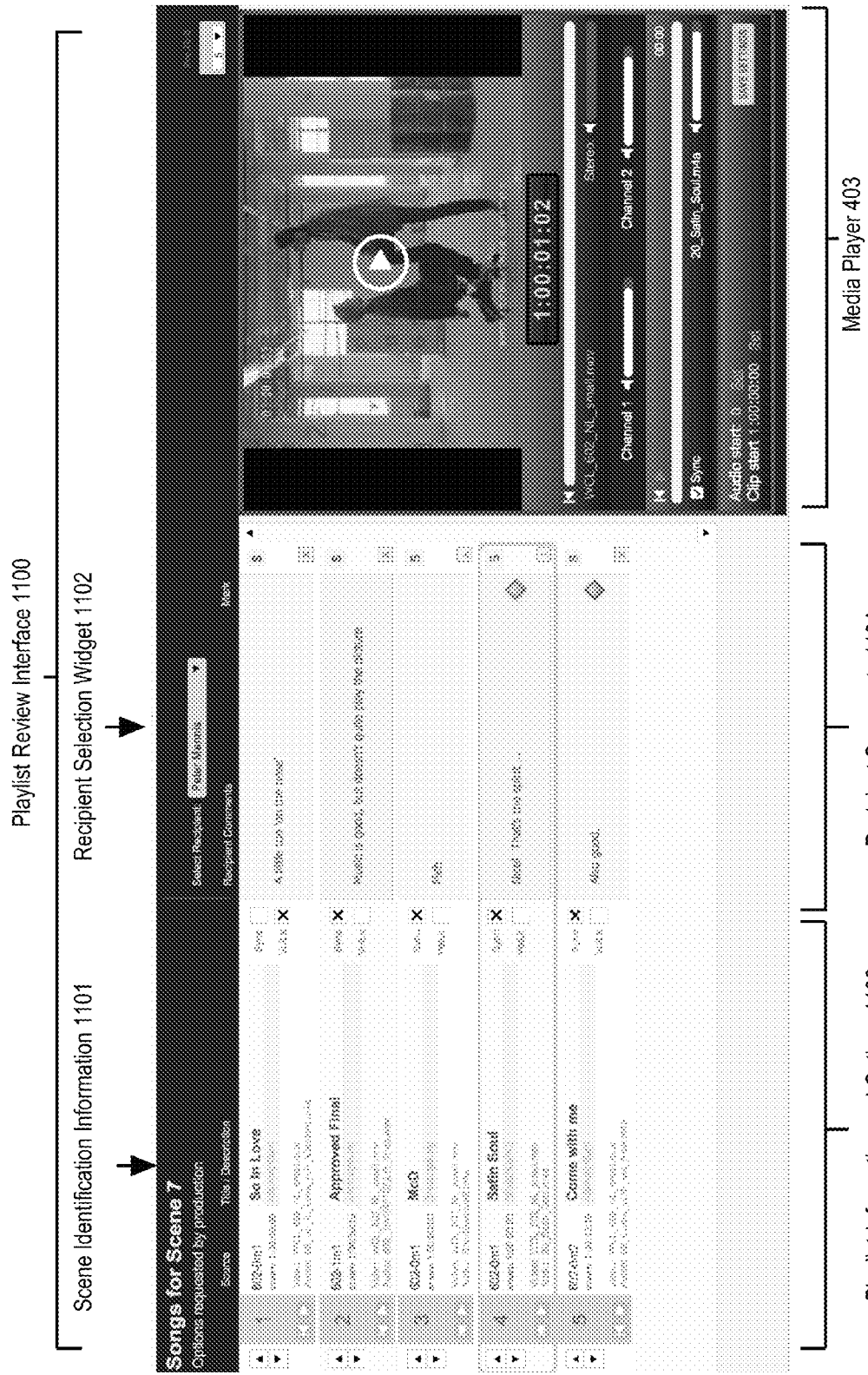
FIG. 11 illustrates a playlist review interface according to an embodiment.

FIG. 11 illustrates an example playlist review interface 1100 according to an embodiment. In FIG. 11, the playlist review interface 1100 includes scene identification information 1101, recipient selection widget 1102, playlist information and options 1103, recipient comments 1104, and a view of the media player 403.

In an embodiment, the scene identification information 1101 contains identification for the scene, such as title and identification number. In some embodiments, if the scene has been assigned an official "in" and "out" time within the production as a whole, the timecodes for the scene are also displayed. Even though the term "scene", the information and playlists displayed in the playlist review interface 1100 can relate to any arbitrary clip or clips for a project being produced.

In an embodiment, recipient selection widget 1102 determines which recipient comments are displayed in recipient comments 1104. In an embodiment, recipient comments 1104 displays comments received from a particular client, which is determined by the recipient selection widget 1102.

Playlist information and options 1103 displays information for each individual playlist, such as whether sync is on or off for the playlist, whether the volume settings can be modified for the playlist, identification of the audio clips involved in the playlist, the sync point of the audio tracks in the playlist, identification of the media assets involved in the playlist, a title for the assets involved in the playlist, a description of the playlist, and so forth. In some embodiments, playlist information and options 1103 include widgets that allow the information within the playlist information and options 1103 to be edited.

Figure 14:
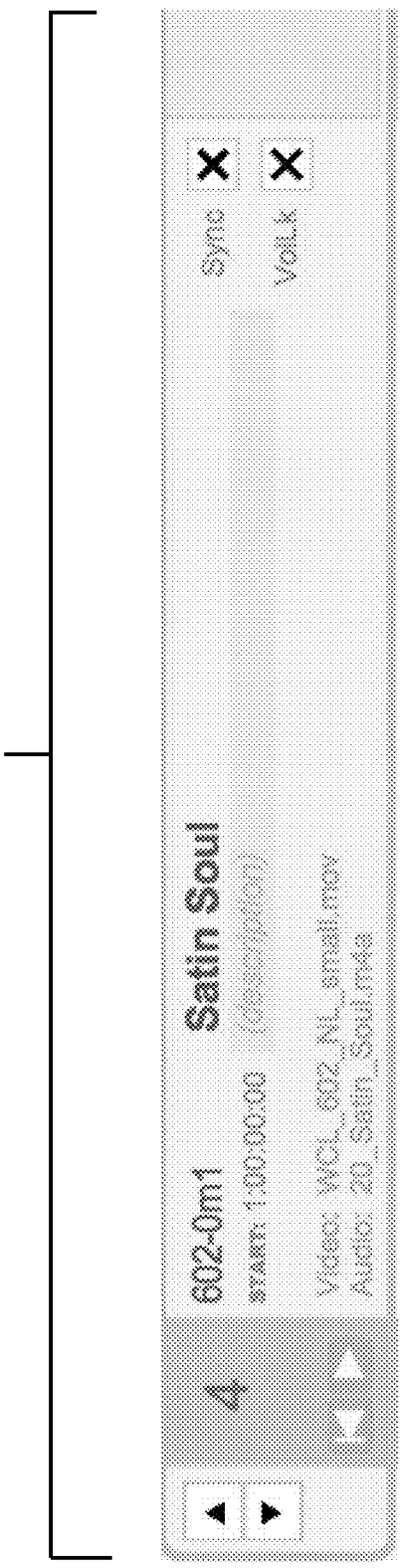
FIG. 14 illustrates a view of an entry in the playlist information and options of the playlist review interface according to an embodiment.

For example, the playlist information and options 1103 can allow users to change whether the sync or audio settings can be modified for the playlist. In FIG. 11, the playlists are displayed in a format where a scene is selected and individual playlists for that scene representing alternative music tracks are displayed. However, in other embodiments, the format may differ, such as displaying a single playlist for all audio track options with widgets for iterating through the options. FIG. 14 illustrates a view of an entry in the playlist information and options 1103.

Figure 17:
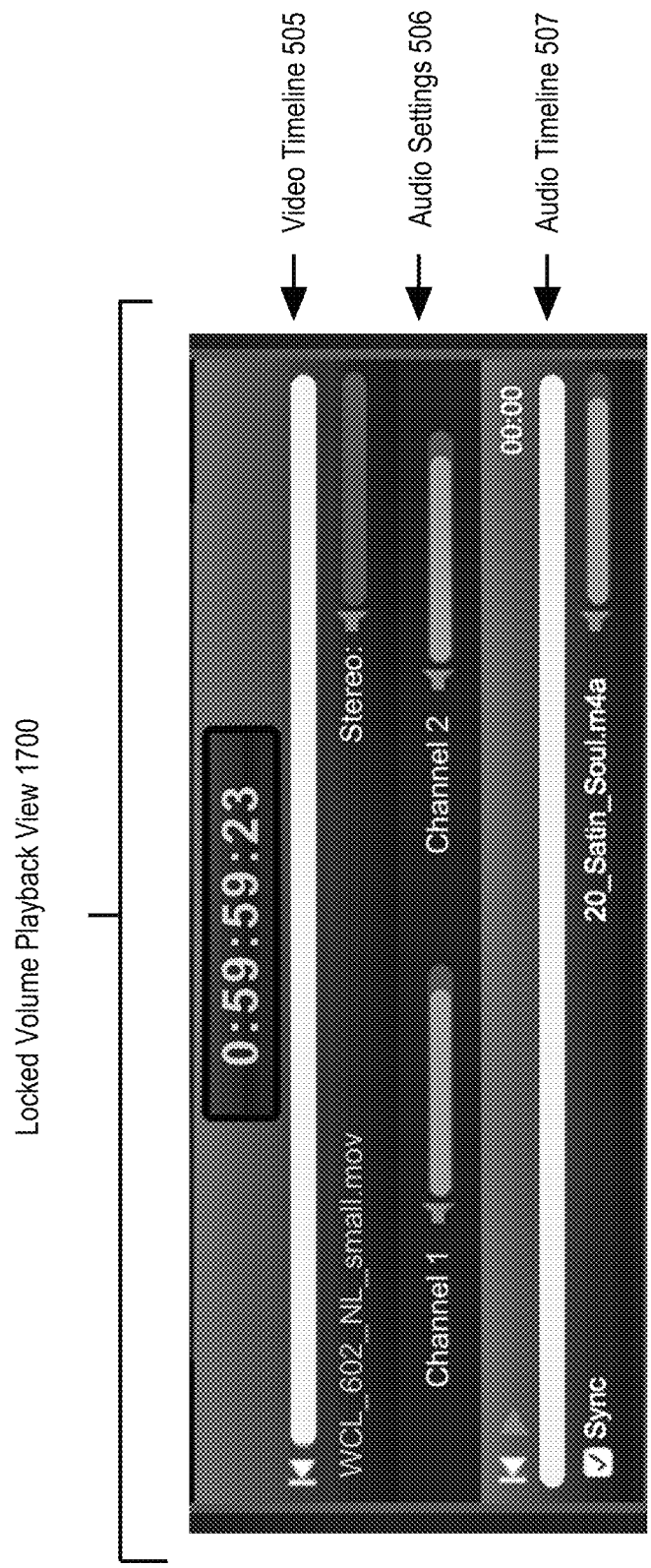
FIG. 17 illustrates a locked volume playback view for a media player according to an embodiment.
Figure 18:
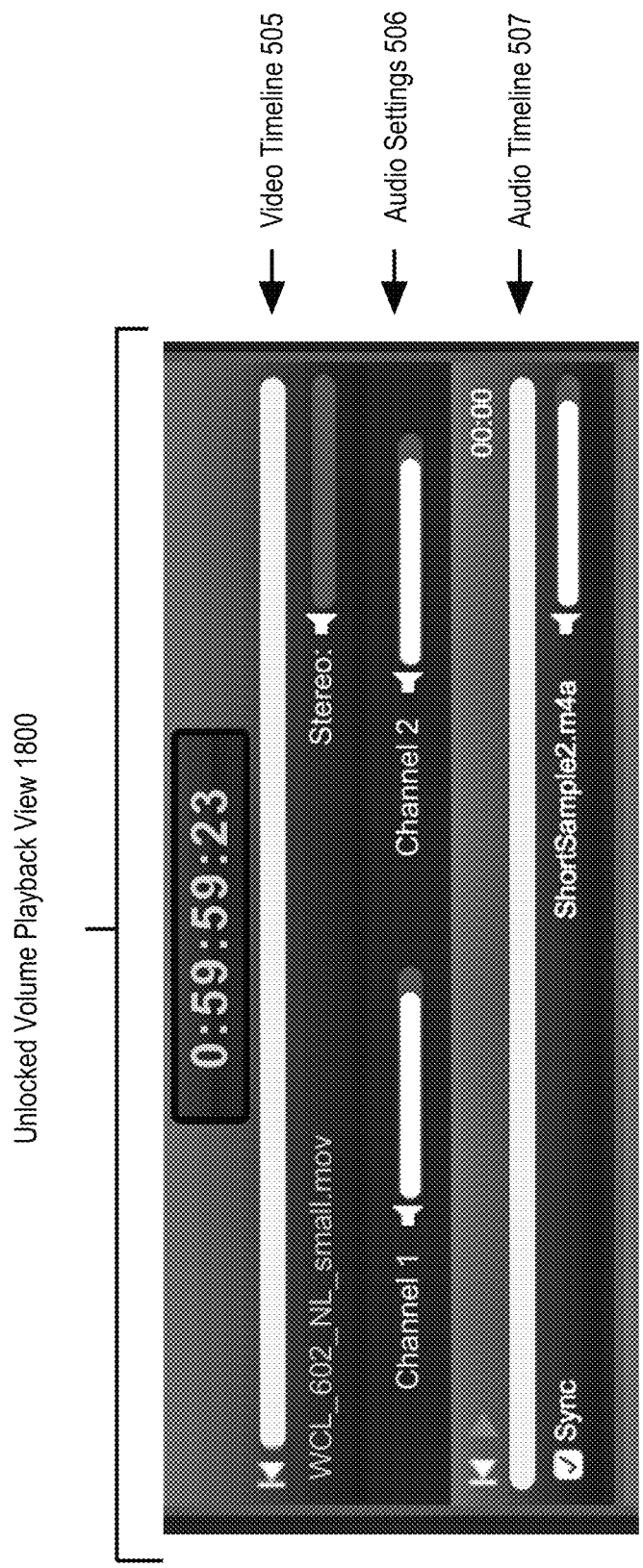
FIG. 18 illustrates an unlocked volume playback view for a media player according to an embodiment.

In some embodiments, the settings of the recipient share options 1202 are carried over to playlists shared to other clients. For example, if client computer 103 shares a playlist with client computer 104 that has the sync and audio settings locked, the sync and audio settings remain locked in the media player 403 that the media player module 303 of the client computer 104 would generate for that playlist. FIG. 17 illustrates a locked volume playback view 1700 for the media player 403. The locked volume playback view 1700 illustrates the scenario where the audio settings are locked and thus the sliders in the audio settings 506 are greyed out or otherwise rendered unavailable. FIG. 18 illustrates an unlocked volume playback view 1800 for the media player. The unlocked volume playback view 1800 illustrates the scenario where the audio settings are unlocked and thus the sliders in the audio settings 506 are brightly lit and available to adjust the volume.

In an embodiment, media player 403 is generated by the media player module 303 by the server communication module 300 in response to receiving user selection of a playlist displayed in the playlist information and options 1103. The server communication module 300 then invokes the media player module 303 to generate the media player 403 by combining the media assets involved in the selected playlist with the playlist information, such as sync point and volume settings.

9.0 Playlist Sharing Interface

Figure 12:
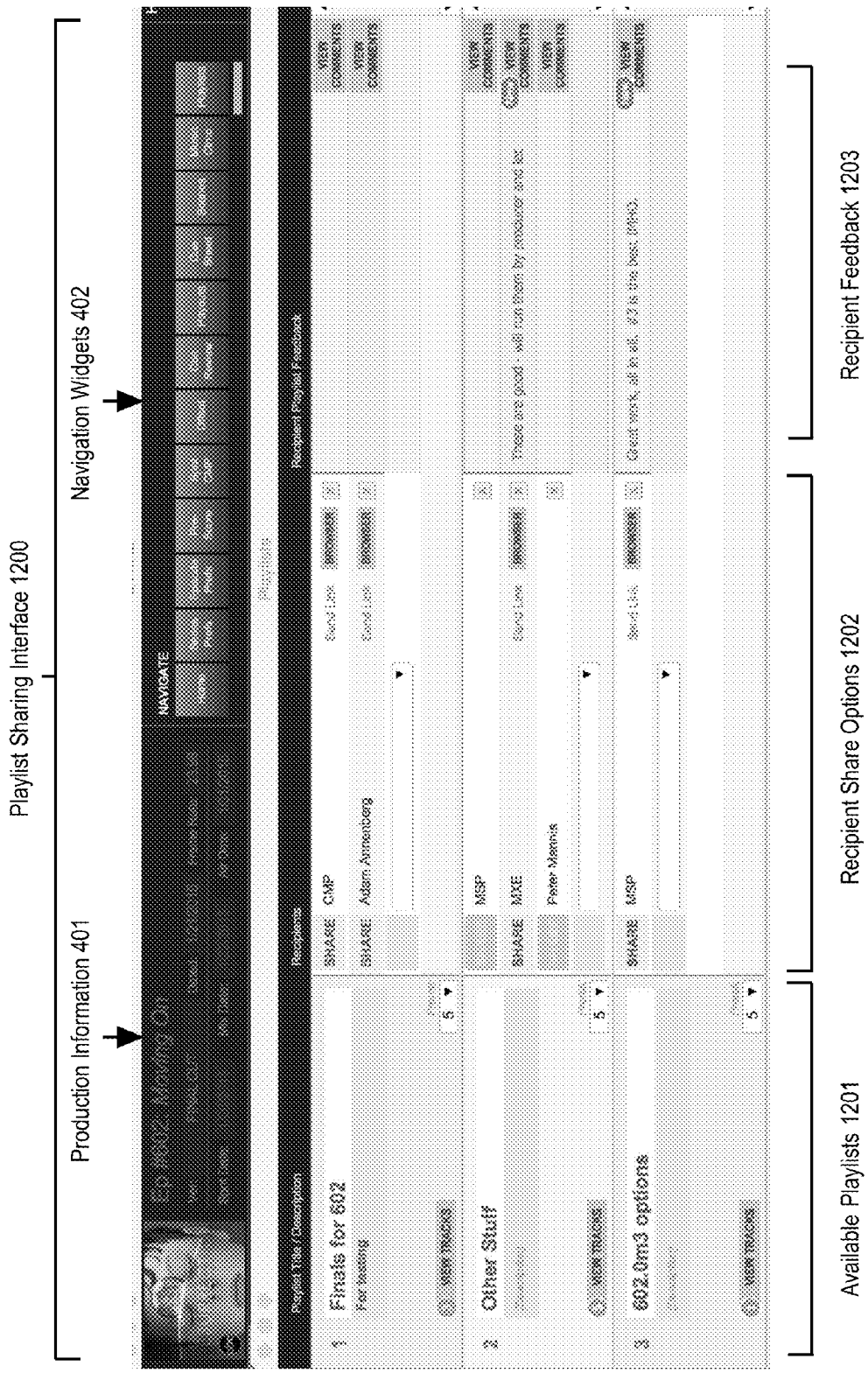
FIG. 12 illustrates a playlist sharing interface according to an embodiment.

FIG. 12 illustrates a playlist sharing interface 1200 according to an embodiment. In FIG. 12, the playlist sharing interface 1200 includes the production information 401 and the navigation widgets 402 discussed above in reference to the production overview interface 400. In addition, the playlist sharing interface 1200 includes available playlists 1201, recipient share options 1202, and recipient feedback 1203.

In an embodiment, the available playlists 1201 identify the individual playlists or groups of playlists available for sharing to other users. The available playlists 1201 identify each playlist by name and description. In addition, the available playlists 1201 include widgets that, when selected, display the media assets involved in the playlist and allow adjusting of the pre-roll value. Furthermore, in some embodiments, the available playlists 1201 can be selected to invoke the media player module 303 to generate the media player 403 to present synchronized media based on the selected playlist.

In an embodiment, the recipient share options 1202 identify which playlist or group of playlists in the available playlists 1201 are shared with which clients. For example, in FIG. 12, playlist "1" is shared with both the "CMP" group and the client representing the individual "Adam Anneberg". The recipient share options 1202 include widgets that allow the user to select new clients with which to share the playlist and to remove clients from the list of approved viewers. In some embodiments, the recipient share options 1202 includes a widget that generates and/or sends a browser link that, when followed by the recipient, causes an interface to be displayed in the browser where the recipient can view the synchronized production and/or provide comments or other feedback. For example, the user with which the playlist is to be shared may be at a client computer that does not have the client application 306 installed, but may have a browser or other application installed that can be used to display the synchronized media production. Thus, the interfaces produced by the client application and/or the media player 403 can be generated for example via HTML/Javascript code to be displayed in a browser, which the recipient is likely to have installed.

In other embodiments, instead of a browser link, the recipient share options 1202 includes a widget that sends data that can be interpreted by a non-browser third party client to present the shared playlist. For example, a third party client can execute a platform that is different than client application 306, but is not a web browser. The server computer 100 can include additional modules designed to handle communications with the platform of the third party client. Thus, when a playlist is shared with such a third party client, the platform is provided information that allows the platform to present the playlist for review or request additional data from the server computer 100 that would allow the platform to present the playlist for review.

In an embodiment, recipient feedback 1203 includes one or more comments from each of the recipients displayed in the recipient share options 1202 that were received in response to a shared playlist. In some embodiments, the comments of each recipient are displayed with a "view comments" button that updates the displayed comments and/or displays a list of extended comments from the recipient. In some embodiments, when new comments are available, the widget is displayed with a special graphic, such as the text "new" being placed overlapping with or near the view comments widget.

Figure 15:
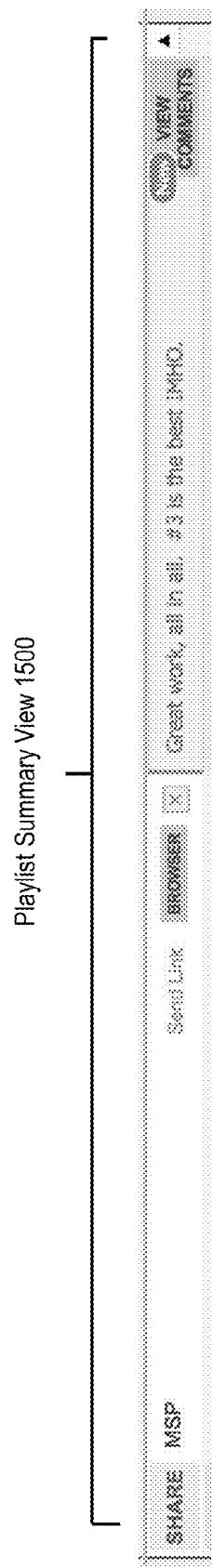
FIG. 15 illustrates an entry of a playlist for a playlist review interface according to an embodiment.

FIG. 15 illustrates a playlist summary view 1500 representing an entry of the recipient share options 1202 and recipient feedback 1203.

10.0 Third Party Sharing Interface

Figure 13:
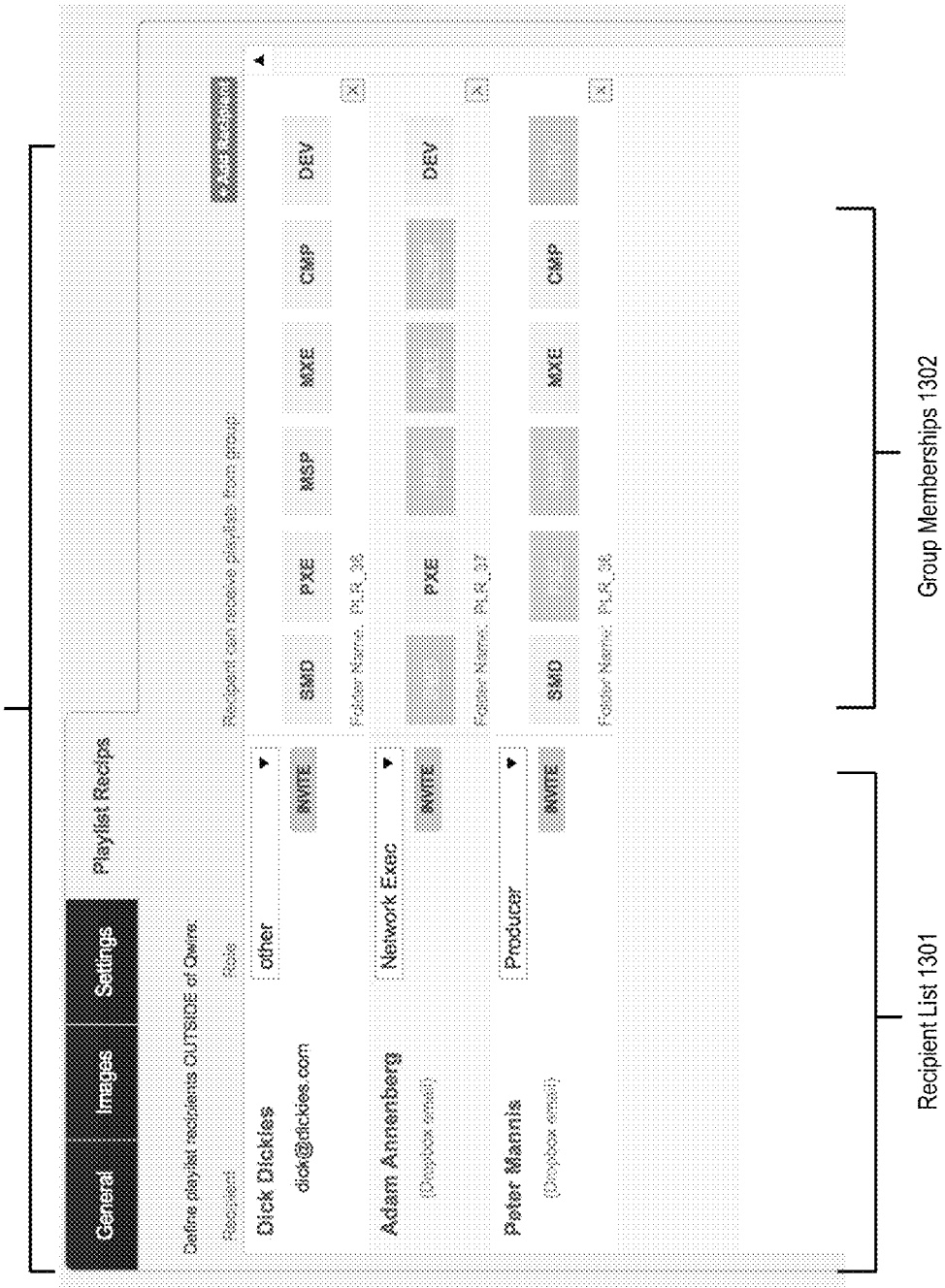
FIG. 13 illustrates a third party sharing interface according to an embodiment.

FIG. 13 illustrates a third party sharing interface 1300 according to an embodiment.

In an embodiment, the third party sharing interface 1300 includes a recipient list 1301 and group memberships 1302. The third party sharing interface 1300 is assumed to be generated by the server communication module 300.

In some embodiments, the server computer 100 is configured to share playlists with clients that do not have the client application 306 installed or may be missing one or more components of the client application 306, such clients are referred to as "third party clients". The third party sharing interface 1300 is an interface that allows users of the client application 306 to share playlists with users who do not have the client application 306 installed and thus the server computer 100 cannot rely on the components of the client application 306 to transfer playlist information and media assets or to provide interfaces for the user to interact with.

In an embodiment, the recipient list 1301 identifies third party clients by an identifier (such as a name), an email address, and/or a role. In addition, the recipient list 1301 includes one or more widgets that invite a third party client to view selected playlists. In an embodiment, the widgets to invite a third party client sends a link similar to the "send link" widget of the recipient share options 1202 of the playlist sharing interface 1200. In this case, the server computer 100 sends a link to the email address of the third party client, which when selected causes a browser of the third party client to display interfaces from which playlist information and the synchronized media presentation can be viewed. In addition, the interfaces allow for the third party user to enter comments or other feedback regarding the playlist.

In an embodiment, group memberships 1302 identify which playlists the third party client is allowed to view. In FIG. 13, the playlists are divided into groups by roles that are allowed to view the playlists. However, in other embodiments, playlists can be assigned to third party clients individually. Thus, from the group memberships 1302, the viewing permissions of the third party client with respect to particular playlists can be added or removed.

11.0 Multiple Platform Availability

In some embodiments, the server computer 100 is configured to share playlists with third party clients. Since the server computer 100 is not able to rely on the server communication module 300 of the client to provide communication and interfaces, the server computer 100 instead generates interfaces for an alternative application, such as a browser, installed on the third party client that performs the same or similar functions. However, in some embodiments, the third party client implements at least a component that is capable of performing file hosting/sharing functions which allow the media transfer module 201 of the server computer 100 to deposit media files for shared playlists. For example, the shared media manager module 301 may utilize a separate application or service to perform the underlying media transfer. Thus, the third party client may not implement the client application 306, but may still implement that separate application or service which the server computer 100 can utilize to transfer the media.

Figure 16:
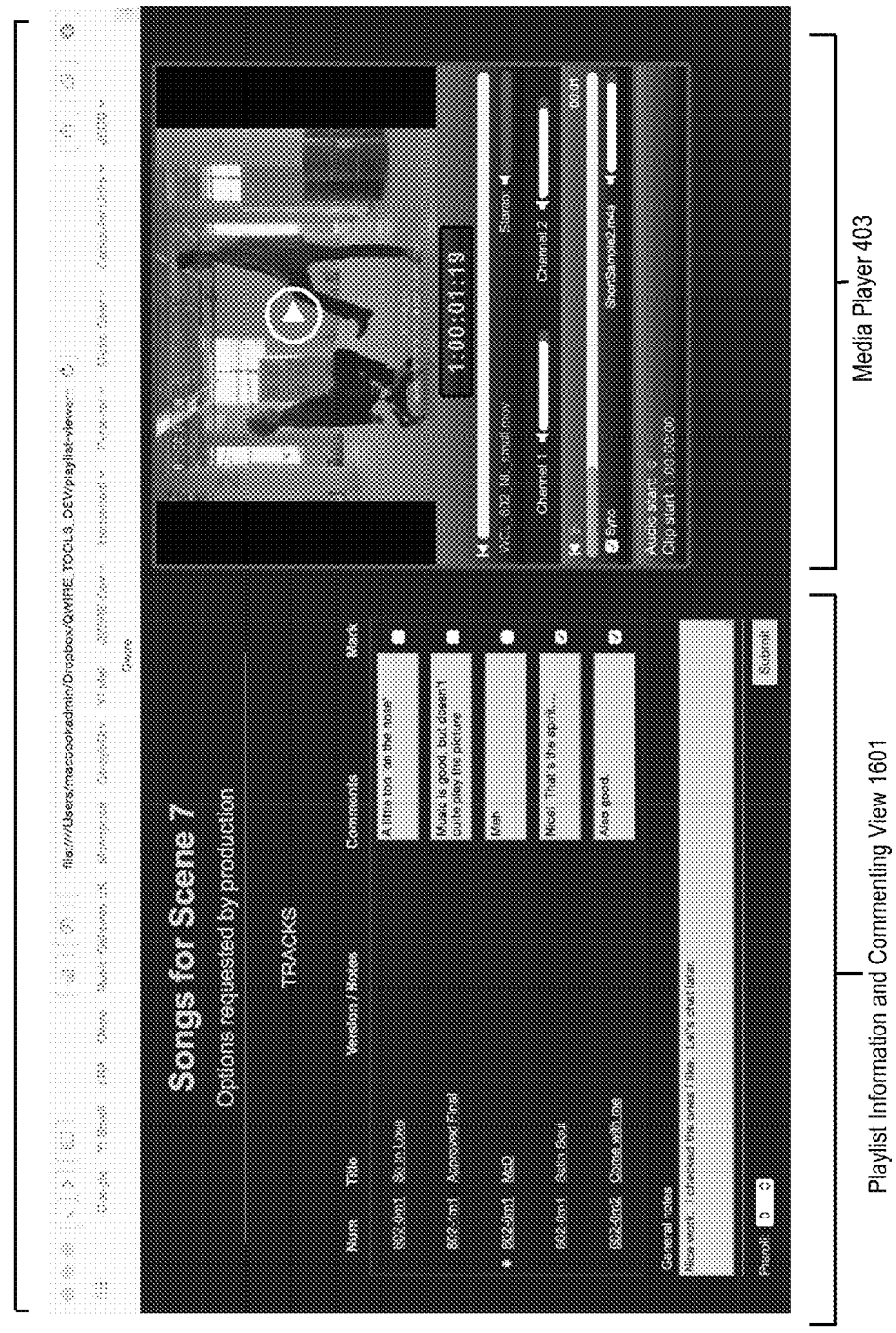
FIG. 16 illustrates a playlist browser interface according to an embodiment.

FIG. 16 illustrates a playlist browser interface 1600 according to an embodiment. In an embodiment, the playlist browser interface 1600 is generated by the server computer 100, for example via HTML/Javascript, in response to a user following a link to a shared playlist. For example, the link generated via the recipient share options 1202 and/or the recipient list 1301 of the third party sharing interface 1300. The playlist browser interface 1600 includes the media player 403 and playlist information and commenting view 1601. Although FIG. 16 displays an interface for a third party client in relation to a browser, the same interface can also be used for presentation by a third party client using an application that is not a browser to view shared playlists.

In an embodiment, the media player 403 is generated as a result of the browser of the third party client rendering a web page supplied by the server computer 100 as a result of following the link. For example, the media player 403 may be the result of executing Javascript code embedded in the webpage. In an embodiment, the code for generating the media player that is executed as a result of the browser rendering the web page retrieves the playlist information and combines that information with media assets stored locally by the third party client. If those assets are unavailable, the server computer 100 transfers those assets to the third party client.

The playlist information and commenting view 1601 includes the audio tracks involved in the playlist. For example, if the playlist involves multiple tracks played sequentially in synchronization with the video asset, each of those tracks can be displayed with information such as identification number, title, version, comments, and so forth. However, in some embodiments, the tracks represented in the playlist information and commenting view 1601 represent alternative music tracks for the same video clip, which can be selected to automatically cause the media player 403 to refresh to a version where the alternative is the audio clip synchronized with the video. In an embodiment, the playlist information and commenting view 1601 includes a general notes section for the project as a whole, in addition to comments specific to each audio track.

12.0 Remote Spotting

Spotting sessions are meetings where any combination of the composer, music editor, director, picture editor, music supervisor, producers, and other members of the production team view the recorded video for a TV show, movie, or other production and decide where music should be added. Previously, spotting sessions were performed in person, typically at the location of the editor, and required a significant amount of traveling and coordination between the participants resulting in delays before the initial cue list could be produced. The earlier the initial cue list can be produced, the more efficient the production workflow becomes since many tasks, such as synchronizing, selecting, and/or composing specific music tracks to fill in the cues identified during spotting cannot begin until the spotting session has been completed. Thus, delays in completing the spotting session can hold up a large number of tasks related to the production.

In some embodiments, the client application 306 includes a remote spotting module 306 for hosting remote spotting sessions to replace in-person meetings to develop the initial cue list. With schedules for productions becoming tighter over time and final deliverables due earlier, remote spotting allows traditionally in-person sessions to be completed remotely, saving time and effort for all the involved parties.

In one approach, spotting sessions are handled by designating one of the clients as a "controller" or "administrator" who performs the editing and streams their display to the other clients participating in the spotting session. Thus, as the controller edits the video and identifies the places where music should be inserted, the other participants can view the actions performed by the controller and provide comments, for instance using a third party telephone or video conferencing service. Streaming services are limited in terms of the frame rate that can be achieved and are generally not stable enough to perform frame-accurate spotting in real time. This is because streaming services typically encode the pixel data of the desktop (or other viewing area) and sends the encoded pixel data to the viewers, which then decode and display the pixels representing each frame of the stream. As a result, the controller must send a significant amount of pixel data to the other participants, which can be severely hindered by a lack of sufficient bandwidth.

In some embodiments, rather than the controller streaming the spotting session to the other participants, the controller sends commands that instructs the media player module 303 of the respective clients to combine the local media assets 304 in the same manner as the media player module 303 of the controller. As a result, rather than sending a stream of pixel data to the participating clients, the controller instead sends commands that shape the playback based on locally stored media files, such as commands to begin playback at a certain timecode, pause the playback, restart the playback, fast forward the playback for a period of time, rewind the playback for a period of time, skip to a particular timecode, establish a cue at particular timecodes, edit established cues, and so forth. Since sending a command requires far less data to be transmitted and less processing to be performed compared to handling pixel data, far less bandwidth is required to maintain an acceptable frame rate for the remote spotting session. In some embodiments, only the controller has the capability of generating/editing cues during the spotting session and/or controlling playback within the media player 403.

In some embodiments, the media files being relied upon during the remote spotting session are transferred ahead of time as discussed above with respect to the server computer 100 and client computer 103 in Section 4.0. However, in other embodiments, the clients may transfer any missing files that will be relied upon during the spotting session in a peer-to-peer manner or through server 102. For example, if the controller attempts to play a video that is not available to all the peers, the file is then transferred to the clients missing the file before playback of the media begins to ensure that each client can play the media from their local storage during the spotting session.

For example, the controller may initially select the video clip or clips to view, which would cause the client application 306 of the controller to display an interface, such as the interface depicted in FIG. 22, that includes a spotting interface 2200 that displays and keeps track of the timecodes where music should be inserted into the production and a media player 403 generated by the media player module 303 that presents the video clips. When playback begins, the remote spotting module 407 of the controller sends a message to the remote spotting module 407 of each of the participants that identifies the video clip to play and a timecode value indicating from where within the video clip playback should begin. When the aforementioned message is received by the remote spotting module 406 of the participating clients, the remote spotting module 406 causes display of a spotting interface 2200 and/or media player 403 that mimics the display of the controller. When the controller performs an action, such as skipping ahead, fast forwarding, rewinding, switching to another video clip, marking timecodes for cues, adjusting settings, and so forth, these actions are represented in messages that the controller sends to the participating clients to cause the participating clients to perform the same actions. Thus, if the controller skips playback of the video from timecode 5:55 to timecode 10:55, this would cause the remote spotting module 307 of the controller to send a message to the remote spotting module 307 of each of the participating clients identifying the action of "skip" and including at least a timecode for where within the video playback should be set. Upon being received, the aforementioned message causes the participating clients to perform the same action as performed by the controller. In some embodiments, for cases where the video clip has embedded audio, for example dialog audio, adjusting audio settings such as volume, stereo sounds, and so forth also causes messages to be sent to the other participating clients to mimic the changes to the audio settings on the controller.

In some embodiments, each message includes a number of fields identifying the action and any auxiliary information required to mimic the action. For example, each action may be given a different identifier (e.g. "skip"=1, "fast forward"=2, "begin playback of new video"=3, "establish new cue"=4, "edit existing cue"=5, and so forth). In addition to the identifier, the message may include auxiliary fields representing information required to perform the action, such as a timecode of where to skip to within the video, timecodes for setting the start and end of a cue, modifications to be made to the start or end time of a cue, comments associated with a cue or timecode, name or identifier of a cue, and so forth. The exact information included in the auxiliary fields is dependent on the action performed by the controller and thus may vary depending on the actions implemented by a given embodiment.

In some embodiments, the remote spotting module 307 includes options to identify audio clips to synchronize with the selected video clip or clips. For example, it is common in TV and movie productions to perform spotting with "temp music" which represents music that can be added to aid collaborators in identifying timecodes for cues, but may not necessarily be the actual music included in the final production. Often times, spotting is performed before the music has even been created by the composer and thus cannot be made available for the spotting session. Thus, in some embodiments, the controller can set timecodes for various cues and then specify music clips to play at those timecodes to preview the video with the temp music. For example, the controller may specify for a particular video clip that timecodes 4:25-7:23 are designated as a cue where music is to be inserted. The manner of specifying the timecodes for a cue can take many different forms depending on the exact implementation. For instance, some embodiments may allow a user to use the time editing widgets 508 to capture timecodes for the frame currently displayed in the video viewer 504 and then export that time as an in or out time for a cue into the spotting interface 2200. As another example, the timecodes can be inserted manually into the spotting interface 2200 by designating the in and out time for the cue. In some embodiments, once the cue is created, the remote spotting module 307 of the controller sends a message to the remote spotting module 307 of the other participating clients identifying the cue and the associated timecodes. In response to receiving the message, the remote spotting module 307 of the other participating clients update the spotting interface 2200 to display the cue, the associated timecodes, the audio clip representing the temp music (if applicable), and so forth. However, in other embodiments, the spotting interface 2200 may only be displayed to the controller or the client which initiated the remote spotting session. Furthermore, other embodiments may omit the spotting interface 2200 from the remote spotting session entirely, thus relaying on the user to go back to the spotting interface 2200 with the notes collected during the spotting session to fill in the cue information.

In some embodiments, the media player 403 includes audio controls, such as the audio settings 506 and time editing widgets 508 depicted in FIG. 10, which allows the synchronization between the video and the temp music to be edited. In such cases, the edits to the synchronization between the video and the temp music, such as when playback of the music clip begins and ends during the cue, are also communicated to the other clients for display in their respective spotting interface 2200.

In some embodiments, the interfaces utilized by the remote spotting module 307 use the techniques discussed above in Section 11.0 to provide availability to third party platforms, such as via a browser interface. Thus, in some embodiments, the interfaces displayed during the remote spotting session represent web interfaces displayed by a browser program.

In some embodiments, the remote spotting module 307 displays an interface that includes one or more widgets that allow control to be passed to another participating client. When control is passed, the participating client becomes the controller and the previous controller becomes one of the participating clients. The new controller then becomes capable of editing the cues and/or controlling the playback of the media player 403 and the actions performed by the new controller are then mimicked by the other participating clients.

In some embodiments, the remote spotting module 307 also causes display of an interface that provides a video conferencing service, a voice conferencing service, a chat service, or combinations thereof. For example, in addition to or incorporated within the remote spotting interface may be an area where communications between the participants is displayed. For example, in the case of a voice conference, the interface may include a user name for each of the participants which "lights up" or otherwise indicates when a participant is speaking into their respective microphone. As another example, in the case of video conferencing, a portion of the interface may be dedicated to display video streams from one or more web cameras of the respective participants. As yet another example, in the case chat service, the remote spotting interface may include a chat box where users can type their comments and see written communications typed by other participants. Furthermore, a third party conferencing program may also be utilized by the remote spotting module 306. For instance, the remote spotting module 307 may interface with a conferencing service such as Google Hangout or Skype using a corresponding API and thus rely on the third party application to provide communications between the participants. For example, a portion of the display of the remote spotting interface may be dedicated to a chat room or video feed provided by a third party conferencing service.

In some embodiments, during the remote spotting session, the remote spotting module 307 records communications between the participants (e.g. voice, video, text, and so forth) and marks in timecodes within the video where those communications took place. Thus, if the communications are reviewed again at a later time, for instance by an editor who is deciding the actual music to play during the cues, the communications can be easily matched to the portion of the video to which those communications pertain. For instance, in the case of a chat comment, each line of the chat may be marked with the timecode of the video that was displaying when the comment was received. To review the comment, a user may select the timecode next to a comment to cause the media player 403 to begin playback of the video at the corresponding time.

In some embodiments, at the conclusion of a spotting session, the cues developed over the course of the session are transmitted to the server computer 100 and stored within the server database 101 in association with the participants. For example, the record may identify the video, start and end time of each cue, comments associated with each cue, and so forth for later retrieval and viewing by the participants.

12.1 Remote Spotting Controller Interface

Figure 24:
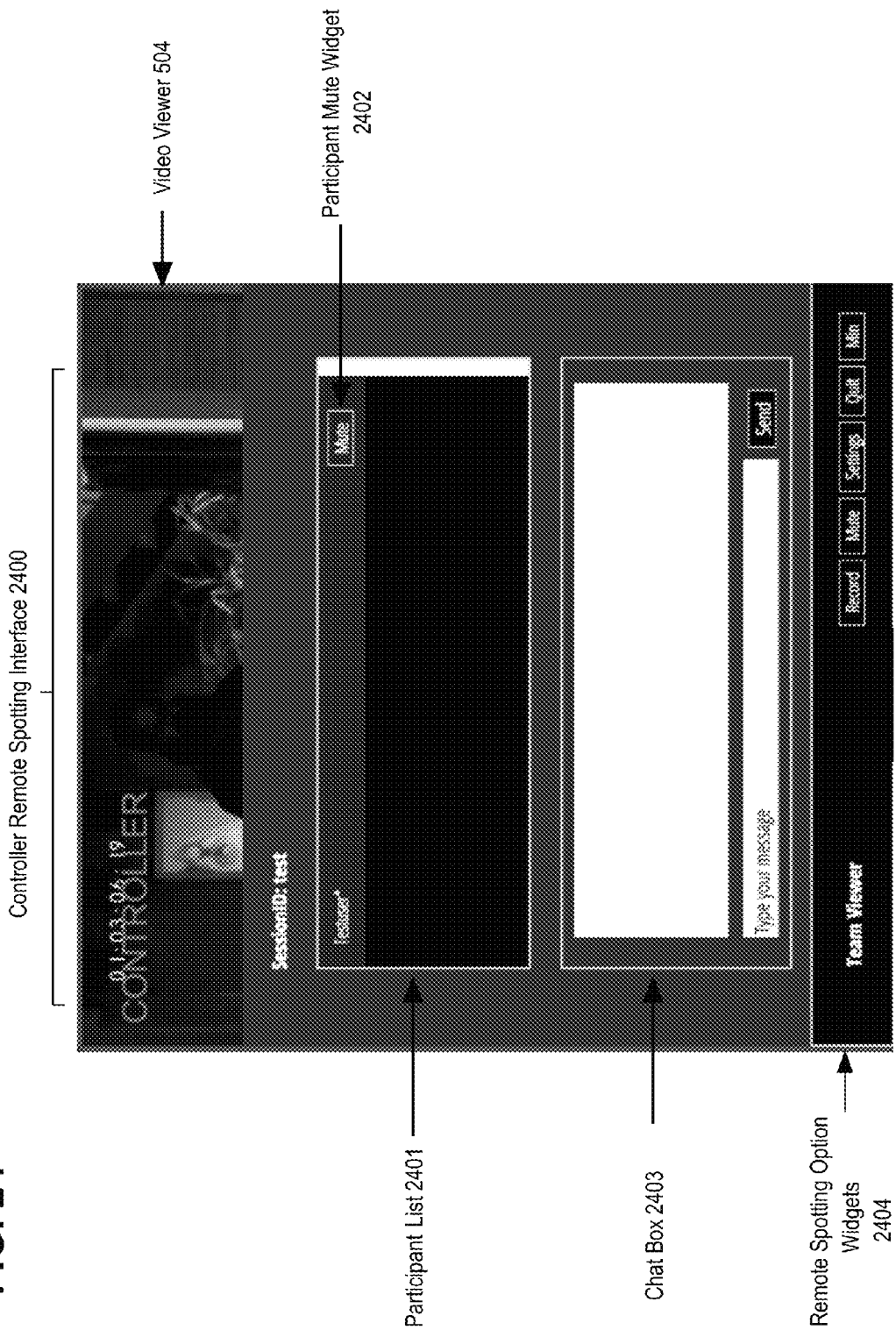
FIG. 24 illustrates a first view of a controller remote spotting interface according to an embodiment.

FIG. 24 illustrates a first view of a controller remote spotting interface according to an embodiment. In FIG. 24, a controller remote spotting interface 2400 includes a video viewer 504, participant list 2401, participant mute widget 2402, chat box 2403, and remote spotting option widgets 2404.

In an embodiment, the controller remote spotting interface 2400 is an extension of the media player 403 discussed above. Thus, the controller remote spotting interface 2400 may contain the same widgets and functionality of the media player 403, but also include widgets and functionality to support and control remote spotting across a number of participating clients. For example, the controller remote spotting interface 2400 may contain the video viewer 504 as well as the widgets and options for controlling playback, volume levels, timecode capture, and so forth discussed above. However, in other embodiments the controller remote spotting interface 2400 may appear different from the display of media player 403 in terms of design and may include more or less functionality than the interface discussed above in relation to the media player 403. Furthermore, although the controller remote spotting interface 2400 displays only part of the video viewer 504, in the embodiment displayed in FIG. 24, options related to remote spotting are brought up in response to receiving user selection of the remote spotting option widgets 2304 and may temporarily cover or partially cover the media player 403.

In an embodiment, the participant list 2401 provides a list that identifies all users of clients who are currently connected to the remote viewing session. In some embodiments, when a client connects to a remote viewing session a dialog box is brought up where the user can submit their name to be displayed during the session. However, in other embodiments the remote viewing session may require a user name/password or other credential that is used to verify the account of the user and also allows the user name to be displayed within the participant list 2401.

In an embodiment, the participant mute widget 2402 allows communications from the associated user to be blocked. For example, in the case of chat, comments from the user may be prevented from being displayed. As another example, in the case of digital telephony or other audio communication, the sounds recorded from a recording device (e.g. a microphone) of the muted user will not be communicated to the other participants or played back through the controller. In FIG. 24 only one user is displayed in the participant list 2401. However, in other embodiments there may be any number of users displayed within the participant list 2401, each with their own respective participant mute widget 2302.

In an embodiment, the chat box 2403 is a region of the controller remote spotting interface 2400 where a user of the controller can submit their own text or graphical comments and view the text or graphical comments submitted by other participants. In some embodiments, the participating clients display their own respective chat boxes 2403 as well, to collect text comments from the participating clients and to display received text comments to the participating clients. In other embodiments the chat box 2402 may be replaced or augmented with a region to display video collected from a video input device (e.g. a webcam) or an indication of which user within the participant list 2401 is currently speaking into their respective audio recording device (e.g. a microphone).

In an embodiment, the remote spotting option widgets 2404 represent options that pertain to remote spotting sessions. For example, the remote spotting option widgets 2404 may contain widgets to record the current spotting session for later playback, mute particular users, bring up a settings menu, quit out of the remote spotting session, minimize the display related to the remote spotting session, and so forth. In some embodiments, selecting a widget to bring up an option menu causes the view of the controller remote spotting interface 2400 to shift to the view presented in FIG. 25.

Figure 25:
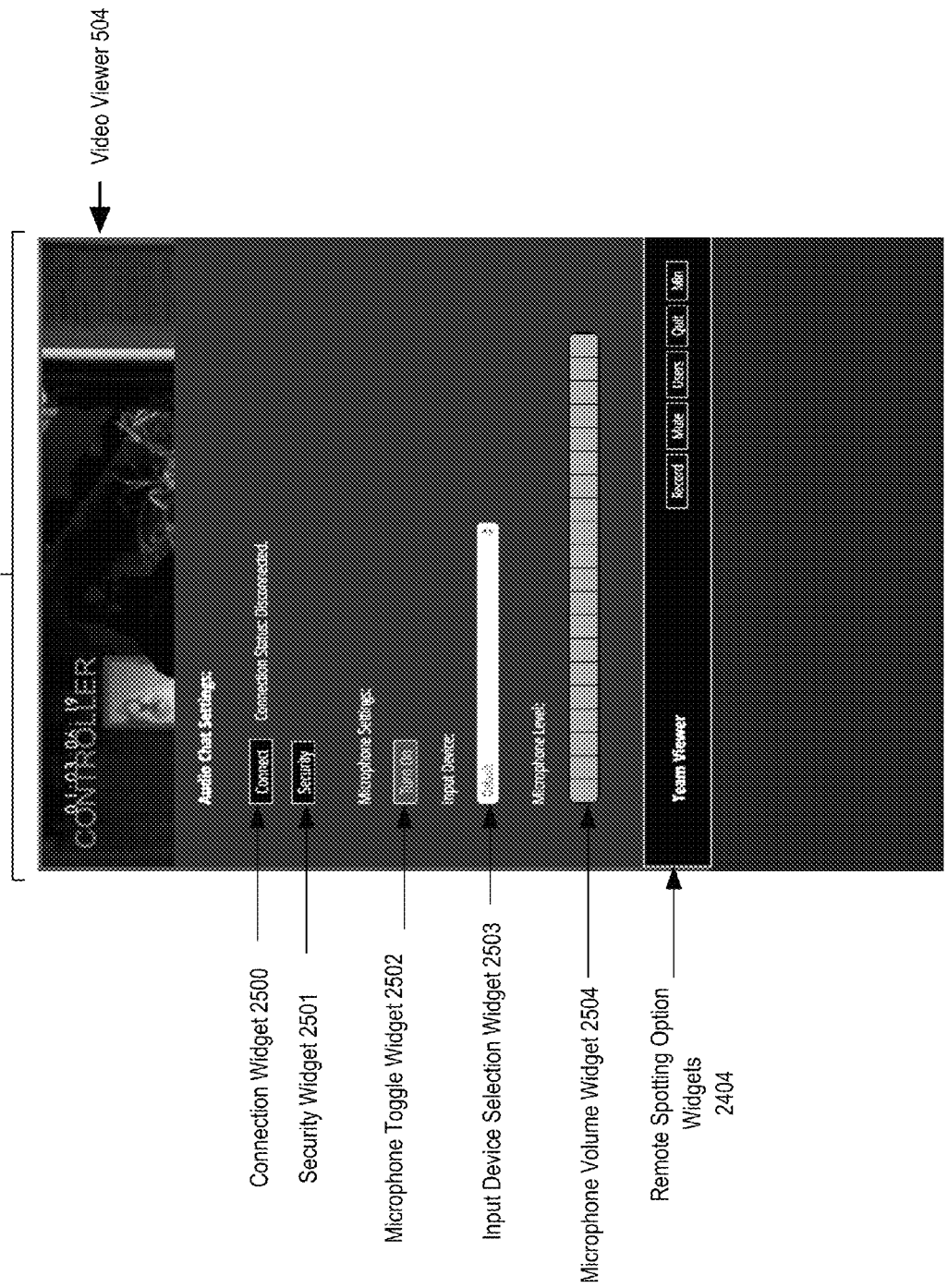
FIG. 25 illustrates a second view of a controller remote spotting interface according to an embodiment.

FIG. 25 illustrates a second view of a controller remote spotting interface 2400 according to an embodiment. In FIG. 25, the controller remote spotting interface 2400 contains a video viewer 504, connection widget 2400, security widget 2401, microphone toggle widget 2402, input device selection widget 2403, microphone volume widget 2304, and remote spotting option widgets2304.

In an embodiment, the connection widget 2400 controls whether the controller is connected to a remote spotting session. For example, upon receiving selection of the connection widget 2400, the controller may start up a session. In some embodiments, the participating clients have a similar option, which allows them to connect to a session hosted by the controller. For example, the participating clients may submit the user name, internet address, or other identification of the controller to be connected to a session hosted by the controller. However, in other embodiments, the connection widget 2400 may provide an option to the controller to invite participating clients to join the session, rather than relying on the participating clients to provide information identifying the controller.

In an embodiment, the security widget 2401, when selected, causes the controller to display options related to security of the spotting session. For example, the security widget 2401 may allow the host to set an encryption scheme for communications sent during the remote spotting session, control permissions regarding who can join the session, set a password for the session, and so forth.

In an embodiment, the microphone toggle widget 2402, when selected, allows the controller to toggle an input device on or off in case a user of the controller needs to speak, but does not want to broadcast their speech to the participating clients. In an embodiment, the input device selection widget 2403 provides options, such as a dropdown list, where selection of a suitable input device available to the controller can be selected by a user. In an embodiment, microphone volume widget 2304 allows a user of the controller to set the volume level of the input device selected via the input device selection widget 2403.

In an embodiment, remote spotting option widgets 2404 has been updated compared to the first view displayed in FIG. 24 to replace the options menu with a "users" menu. In an embodiment, selecting the users menu causes the display of the controller remote spotting interface 2400 to revert back to the view displayed in FIG. 24.

12.2 Remote Spotting Client Interface

Figure 26:
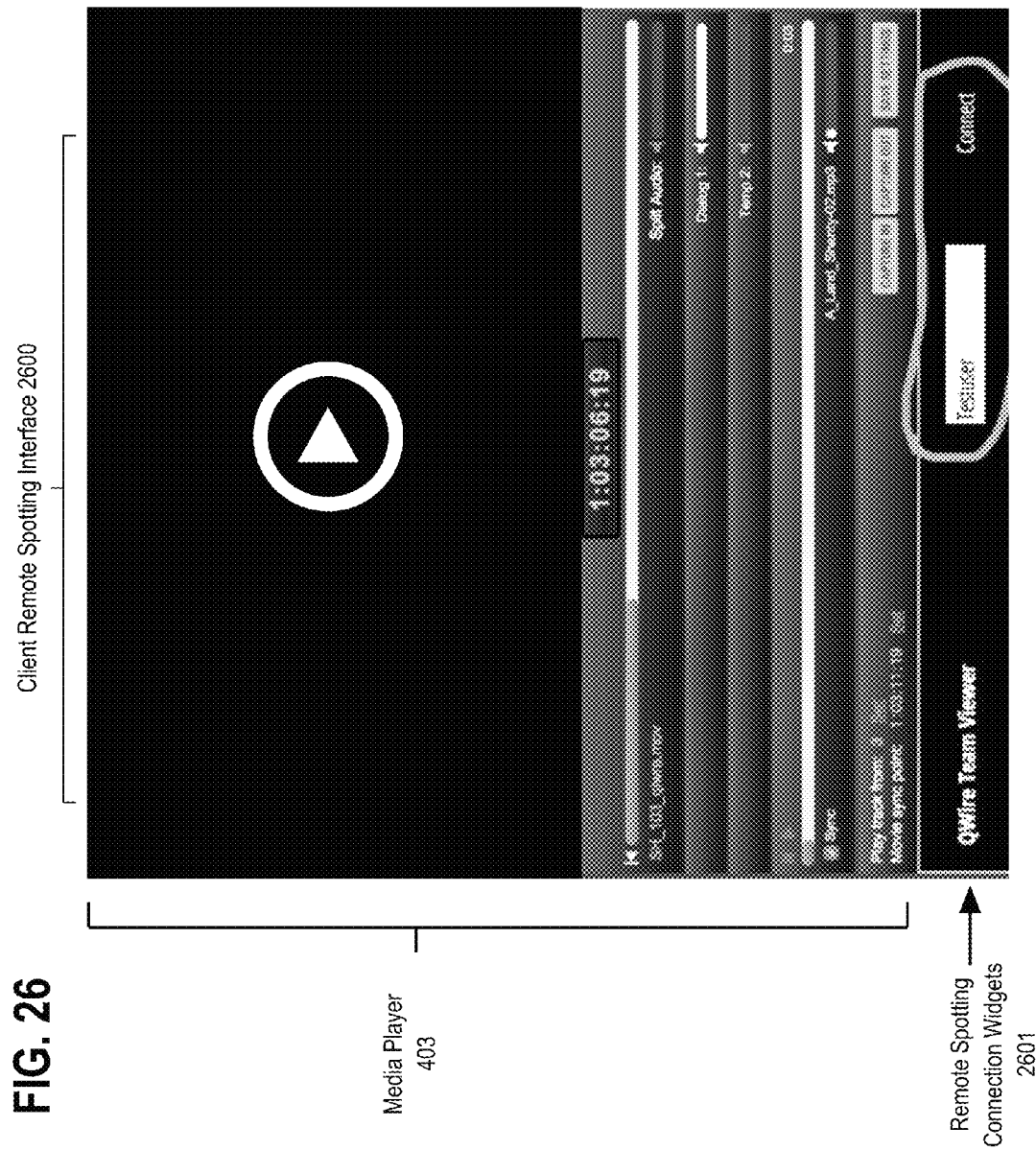
FIG. 26 illustrates a client remote spotting interface according to an embodiment.

FIG. 26 illustrates a client remote spotting interface according to an embodiment. In FIG. 26, the client remote spotting interface 2600 includes the media player 403 and remote spotting connection widgets 2601.

In some embodiments, the client remote spotting interface 2600 is an extension of the media player 403 discussed above. Thus, in such embodiments the client remote spotting interface 2600 includes the widgets and functionality discussed above with respect to the media player 403. However, in other embodiments the client remote spotting interface 2600 may include a different set of functionality and widgets compared to the media player 403 discussed above.

In an embodiment, the remote spotting connection widgets 2601 are a set of widgets that allow a user to submit input identifying a controller hosting a remote spotting session and connect to the remote spotting session. For example, the remote spotting connection widgets 2601 may include a dialog box for entering an identifier of the controller (e.g. user name, internet address, and so forth) and a button which can be selected to connect to the session hosted by the identified controller. In some embodiments, when a client connects to a remote spotting session, the control of the media player 403 is effectively passed to the controller. Thus, the playback and/or synchronization of the media assets stored locally by the client comes under control of the controller and will mimic the media production that is currently being displayed by the controller. Furthermore, connecting to a remote session may also replace the remote spotting connection widgets 2601 with a set of widgets for viewing users and options pertaining to the remote spotting session, such as the remote spotting option widgets 2404 discussed above in Section 12.1. In some embodiments, the options presented by the aforementioned widgets are similar to the options discussed above in Section 12.1, with the exception of features related to administrative options, such as setting the security, muting users, starting/ending the session, and so forth, which are reserved for exclusive use by the controller.

13.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 21:
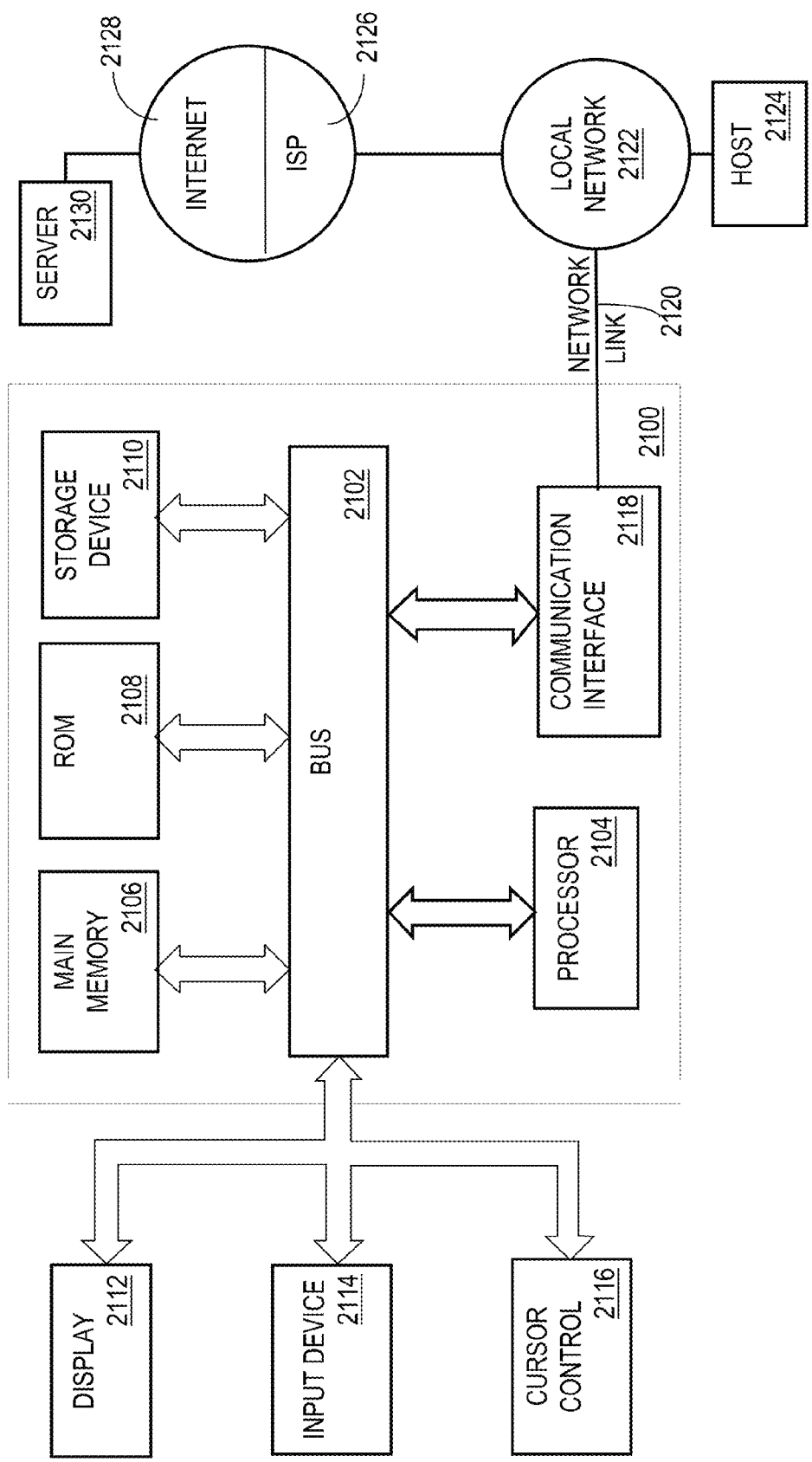
FIG. 21 is a block diagram that illustrates a computer system 2100 upon which an embodiment may be implemented.

For example, FIG. 21 is a block diagram that illustrates a computer system 2100 upon which an embodiment may be implemented. Computer system 2100 includes a bus 2102 or other communication mechanism for communicating information, and a hardware processor 2104 coupled with bus 2102 for processing information. Hardware processor 2104 may be, for example, a general purpose microprocessor.

Computer system 2100 also includes a main memory 2106, such as a random access memory (RAM) or other dynamic storage device, coupled to bus 2102 for storing information and instructions to be executed by processor 2104. Main memory 2106 also may be used for storing temporary variables or other intermediate information during execution of instructions to be executed by processor 2104. Such instructions, when stored in non-transitory storage media accessible to processor 2104, render computer system 2100 into a special-purpose machine that is customized to perform the operations specified in the instructions.

Computer system 2100 further includes a read only memory (ROM) 2108 or other static storage device coupled to bus 2102 for storing static information and instructions for processor 2104. A storage device 2110, such as a magnetic disk or optical disk, is provided and coupled to bus 2102 for storing information and instructions.

Computer system 2100 may be coupled via bus 2102 to a display 2112, such as a cathode ray tube (CRT), for displaying information to a computer user. An input device 2114, including alphanumeric and other keys, is coupled to bus 2102 for communicating information and command selections to processor 2104. Another type of user input device is cursor control 2116, such as a mouse, a trackball, or cursor direction keys for communicating direction information and command selections to processor 2104 and for controlling cursor movement on display 2112. This input device typically has two degrees of freedom in two axes, a first axis (e.g., x) and a second axis (e.g., y), that allows the device to specify positions in a plane.

Computer system 2100 may implement the techniques described herein using customized hard-wired logic, one or more ASICs or FPGAs, firmware and/or program logic which in combination with the computer system causes or programs computer system 2100 to be a special-purpose machine. According to one embodiment, the techniques herein are performed by computer system 2100 in response to processor 2104 executing one or more sequences of one or more instructions contained in main memory 2106. Such instructions may be read into main memory 2106 from another storage medium, such as storage device 2110. Execution of the sequences of instructions contained in main memory 2106 causes processor 2104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 2110. Volatile media includes dynamic memory, such as main memory 2106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2102. Transmission media can also take the form of acoustic or light waves, such as those generated during radio-wave and infra-red data communications.

Various forms of media may be involved in carrying one or more sequences of one or more instructions to processor 2104 for execution. For example, the instructions may initially be carried on a magnetic disk or solid state drive of a remote computer. The remote computer can load the instructions into its dynamic memory and send the instructions over a telephone line using a modem. A modem local to computer system 2100 can receive the data on the telephone line and use an infra-red transmitter to convert the data to an infra-red signal. An infra-red detector can receive the data carried in the infra-red signal and appropriate circuitry can place the data on bus 2102. Bus 2102 carries the data to main memory 2106, from which processor 2104 retrieves and executes the instructions. The instructions received by main memory 2106 may optionally be stored on storage device 2110 either before or after execution by processor 2104.

Computer system 2100 also includes a communication interface 2118 coupled to bus 2102. Communication interface 2118 provides a two-way data communication coupling to a network link 2120 that is connected to a local network 2122. For example, communication interface 2118 may be an integrated services digital network (ISDN) card, cable modem, satellite modem, or a modem to provide a data communication connection to a corresponding type of telephone line. As another example, communication interface 2118 may be a local area network (LAN) card to provide a data communication connection to a compatible LAN. Wireless links may also be implemented. In any such implementation, communication interface 2118 sends and receives electrical, electromagnetic or optical signals that carry digital data streams representing various types of information.

Network link 2120 typically provides data communication through one or more networks to other data devices. For example, network link 2120 may provide a connection through local network 2122 to a host computer 2124 or to data equipment operated by an Internet Service Provider (ISP) 2126. ISP 2126 in turn provides data communication services through the world wide packet data communication network now commonly referred to as the "Internet" 2128. Local network 2122 and Internet 2128 both use electrical, electromagnetic or optical signals that carry digital data streams. The signals through the various networks and the signals on network link 2120 and through communication interface 2118, which carry the digital data to and from computer system 2100, are example forms of transmission media.

Computer system 2100 can send messages and receive data, including program code, through the network(s), network link 2120 and communication interface 2118. In the Internet example, a server 130 might transmit a requested code for an application program through Internet 2128, ISP 2126, local network 2122 and communication interface 2118.

The received code may be executed by processor 2104 as it is received, and/or stored in storage device 2110, or other non-volatile storage for later execution.

14.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

15.0 Additional Disclosure

Aspects of the subject matter described herein are set out in the following numbered clauses:

1. A method comprising: using a server computer, over a computer network, receiving digital message comprising a playlist from a first client computer, wherein the playlist identifies a plurality of media assets and includes synchronization information that specifies how to present the plurality of media assets as a synchronized media presentation; using the server computer, receiving a request from the first client computer to share the playlist with a second client computer; using the server computer, causing the plurality of media assets to be deposited in a digital client storage that is accessible to the second client computer; using the server computer, sending the playlist to the second client computer; using the second client computer, presenting the synchronized media presentation based on the plurality of media assets depositied in the client storage and the synchronization information of the playlist.

2. The method of Clause 1, further comprising: the server computer receiving an updated playlist from the first client computer, wherein the updated playlist is an updated version of the playlist; using the server computer, sending the updated playlist to the second client computer; using the second client computer, presenting an updated synchronized media presentation based on the synchronization information of the updated playlist and the plurality of media assets.

3. The method of any of Clauses 1-2, wherein the synchronization information includes one or more of: volume controls for one or more audio assets in the plurality of media assets, a sync point identifying where within playback of a video asset an audio asset is to begin playback, an identifier indicating a position of an audio asset to begin playback, an identifier that controls whether the volume controls can be modified, an identifier that controls whether playback of video assets can be adjusted separately from playback of audio assets.

4. The method of any of Clauses 1-3, further comprising, using the server computer, depositing the plurality of media assets in the client storage in a shared folder established by the second client computer for receiving media assets.

5. The method of any of Clauses 1-4, further comprising, using the second client computer, presenting the synchronized media presentation in a media player that includes controls for adjusting playback of audio assets within the synchronized media presentation respective to a video asset within the synchronized media presentation.

6. The method of any of Clauses 1-5, further comprising: presenting the synchronized media presentation in an interface that includes widgets for collecting one or more comments regarding the playlist; using the second client computer, sending the one or more comments to the server computer; using the server computer, in response to receiving the one or more comments, causing an update to an interface of the first client computer to display the one or more comments.

7. The method of any of Clauses 1-6, further comprising: the server computer generating a link to the playlist and sending the link to an account associated with the second client computer; the server computer receiving a request for the playlist from the second client computer, wherein the request is generated by the second client computer in response to receiving user input selecting the link; the server computer sending data to the second client computer, which when interpreted by a third party application, causes the third party application to display an interface that presents the synchronized media presentation.

8. The method of claim 7, wherein the data represents a web page and the third party application represents a web browser.

9. The method of any of Clauses 1-8, wherein the request from the first client computer to share the playlist with a second client computer includes the second client computer as one of a plurality of client computers with which to share the playlist.

10. The method of any of Clauses 1-9, further comprising, using the server computer, causing the plurality of media assets to be deposited in the client storage accessible to the second client computer by sending a message authorizing transfer of the plurality of media assets from a storage location associated with the first client computer to the client storage accessible to the second client computer.

11. The method of any of Clauses 1-10, further comprising: wherein the second client computer presents the synchronized media presentation by at least causing a portion of a first media asset of the plurality of media assets and a portion of a second media asset of the plurality of media assets to be presented simultaneously based on the synchronization information.

12. The method of any of Clauses 1-11, further comprising, using the server computer, causing the plurality of media assets to be deposited in the client storage accessible to the second client computer via a background process of the second client computer and sends the playlist to the second client computer via a non-background application process.

13. The method of any of Clauses 1-12, further comprising, using the server computer, sending the playlist to the second client computer in response to receiving a message from the non-background application process.

14. One or more non-transitory computer-readable media storing instructions that, when executed by one or more computing devices, causes performance of any one of the methods recited in Clauses 1-13.

15. A system comprising one or more computing devices comprising components, implemented at least partially by computing hardware, configured to implement the steps of any one of the methods recited in Clauses 1-13.

What is claimed is:
1. A method comprising:
using a server computer, over a computer network, receiving digital message comprising a playlist from a first client computer, wherein the playlist identifies a plurality of media assets and includes synchronization information that specifies how to present the plurality of media assets as a synchronized media presentation;
wherein the plurality of media assets comprises a video asset and an audio asset, wherein the synchronization information specifies one or more periods of time when the audio asset should be played concurrently with the video asset;

using the server computer, receiving a request from the first client computer to share the playlist with a second client computer;
using the server computer, causing the plurality of media assets to be deposited in a digital client storage that is accessible to the second client computer;
using the server computer, sending the playlist to the second client computer;
using the second client computer, presenting the synchronized media presentation based on the plurality of media assets deposited in the digital client storage and the synchronization information of the playlist;
the server computer receiving an updated playlist from the first client computer, wherein the updated playlist is an updated version of the playlist;
using the server computer, sending the updated playlist to the second client computer;
using the second client computer, presenting an updated synchronized media presentation based on the synchronization information of the updated playlist and the plurality of media assets, wherein the server computer does not cause an updated version of the plurality of media assets to be deposited in the digital client storage between depositing the plurality of media assets in the digital client storage and the plurality of media assets being used to present the updated synchronized media presentation, wherein the updated playlist specifies a different one or more periods of time when the audio asset should be played concurrently with the video asset.

2. The method of claim 1, wherein the synchronization information includes one or more of: volume controls for one or more audio assets in the plurality of media assets, a sync point identifying where within playback of a video asset an audio asset is to begin playback, an identifier indicating a position of an audio asset to begin playback, an identifier that controls whether the volume controls can be modified, an identifier that controls whether playback of video assets can be adjusted separately from playback of audio assets.

3. The method of claim 1, further comprising, using the server computer, depositing the plurality of media assets in the digital client storage in a shared folder established by the second client computer for receiving media assets.

4. The method of claim 1, further comprising, using the second client computer, presenting the synchronized media presentation in a media player that includes controls for adjusting playback of audio assets within the synchronized media presentation respective to a video asset within the synchronized media presentation.

5. The method of claim 1, further comprising:
presenting the synchronized media presentation in an interface that includes widgets for collecting one or more comments regarding the playlist;
using the second client computer, sending the one or more comments to the server computer;
using the server computer, in response to receiving the one or more comments, causing an update to an interface of the first client computer to display the one or more comments.

6. The method of claim 1, further comprising:
the server computer generating a link to the playlist and sending the link to an account associated with the second client computer;
the server computer receiving a request for the playlist from the second client computer, wherein the request is generated by the second client computer in response to receiving user input selecting the link;
the server computer sending data to the second client computer, which when interpreted by a third party application, causes the third party application to display an interface that presents the synchronized media presentation.

7. The method of claim 6, wherein the data represents a web page and the third party application represents a web browser.

8. The method of claim 1, wherein the request from the first client computer to share the playlist with a second client computer includes the second client computer as one of a plurality of client computers with which to share the playlist.

9. The method of claim 1, further comprising, using the server computer, causing the plurality of media assets to be deposited in the digital client storage accessible to the second client computer by sending a message authorizing transfer of the plurality of media assets from a storage location associated with the first client computer to the digital client storage accessible to the second client computer.

10. The method of claim 1, further comprising, using the server computer, causing the plurality of media assets to be deposited in the digital client storage accessible to the second client computer via a background process of the second client computer and sends the playlist to the second client computer via a non-background application process.

11. The method of claim 10, further comprising, using the server computer, sending the playlist to the second client computer in response to receiving a message from the non-background application process.

12. A non-transitory computer-readable storage medium storing one or more instructions which, when executed by one or more processors, cause the one or more processors to perform steps comprising:
a server computer receiving a playlist from a first client computer, wherein the playlist identifies a plurality of media assets and includes synchronization information that specifies how to present the plurality of media assets as a synchronized media presentation;
wherein the plurality of media assets comprises a video asset and an audio asset, wherein the synchronization information specifies when the audio asset should be played concurrently with the video asset;
the server computer receiving a request from the first client computer to share the playlist with a second client computer;
the server computer causing the plurality of media assets to be deposited in a digital client storage accessible to the second client computer;
using the server computer, sending the playlist to the second client computer;
using the second client computer, presenting the synchronized media presentation based on the plurality of media assets deposited in the digital client storage and the synchronization information of the playlist
the server computer receiving an updated playlist from the first client computer, wherein the updated playlist is an updated version of the playlist;
using the server computer, sending the updated playlist to the second client computer;
using the second client computer, presenting an updated synchronized media presentation based on the synchronization information of the updated playlist and the plurality of media assets, wherein the server computer does not cause an updated version of the plurality of media assets to be deposited in the digital client storage between depositing the plurality of media assets in the digital client storage and the plurality of media assets being used to present the updated synchronized media presentation, wherein the updated playlist specifies a different one or more periods of time when the audio asset should be played concurrently with the video asset.

13. The non-transitory computer-readable storage medium of claim 12, wherein the synchronization information includes one or more of: volume controls for one or more audio assets in the plurality of media assets, a sync point identifying where within playback of a video asset an audio asset is to begin playback, an identifier indicating a position of an audio asset to begin playback, an identifier that controls whether the volume controls can be modified, an identifier that controls whether playback of video assets can be adjusted separately from playback of audio assets.

14. The non-transitory computer-readable storage medium of claim 12, wherein the steps further comprise the server computer depositing the plurality of media assets in the digital client storage in a shared folder established by the second client computer for receiving media assets.

15. The non-transitory computer-readable storage medium of claim 12, wherein the steps further comprise the second client computer presenting the synchronized media presentation in a media player that includes controls for adjusting playback of audio assets within the synchronized media presentation respective to a video asset within the synchronized media presentation.

16. The non-transitory computer-readable storage medium of claim 12, wherein the steps further comprise:
presenting the synchronized media presentation in an interface that includes widgets for collecting one or more comments regarding the playlist;
using the second client computer, sending the one or more comments to the server computer;
using the server computer, in response to receiving the one or more comments, causing an update to an interface of the first client computer to display the one or more comments.

17. The non-transitory computer-readable storage medium of claim 12, wherein the steps further comprise:
the server computer generating a link to the playlist and sending the link to an account associated with the second client computer;
the server computer receiving a request for the playlist from the second client computer, wherein the request is generated by the second client computer in response to receiving user input selecting the link;
the server computer sending data to the second client computer, which when interpreted by a third party application, causes the third party application to display an interface that presents the synchronized media presentation.

18. The non-transitory computer-readable storage medium of claim 17, wherein the data represents a web page and the third party application represents a web browser.

19. The non-transitory computer-readable storage medium of claim 12, wherein the request from the first client computer to share the playlist with a second client computer includes the second client computer as one of a plurality of client computers with which to share the playlist.

20. The non-transitory computer-readable storage medium of claim 12, wherein the steps further comprise the server computer causing the plurality of media assets to be deposited in the digital client storage accessible to the second client computer by sending a message authorizing transfer of the plurality of media assets from a storage location associated with the first client computer to the digital client storage accessible to the second client computer.

21. The non-transitory computer-readable storage medium of claim 12, wherein the steps further comprise the server computer causing the plurality of media assets to be deposited in the digital client storage accessible to the second client computer via a background process of the second client computer and sends the playlist to the second client computer via a non-background application process.

22. The non-transitory computer-readable storage medium of claim 21, wherein the steps further comprise the server computer sending the playlist to the second client computer in response to receiving a message from the non-background application process.

* * * * *